(12) United States Patent
Serkh

(10) Patent No.: US 7,530,911 B2
(45) Date of Patent: May 12, 2009

(54) TRAVEL LIMITED LINEAR BELT TENSIONER

(75) Inventor: Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 10/288,855

(22) Filed: Nov. 6, 2002

(65) Prior Publication Data

US 2004/0087401 A1 May 6, 2004

Related U.S. Application Data

(60) Provisional application No. 60/332,645, filed on Nov. 6, 2001.

(51) Int. Cl.
*F16H 7/08* (2006.01)
*F16H 7/12* (2006.01)

(52) U.S. Cl. .................. 474/134; 474/133; 474/138

(58) Field of Classification Search ......... 474/134–138, 474/109, 111, 117, 101, 118; 123/90.15, 123/90.31

See application file for complete search history.

(56) References Cited

U.S. PATENT DOCUMENTS

| | | | | |
|---|---|---|---|---|
| 2,185,079 A * | 12/1939 | Hall | ............... | 474/134 |
| 3,575,058 A * | 4/1971 | Kraus | ............... | 474/134 |
| 3,817,113 A * | 6/1974 | Pfarrwaller | ............... | 474/134 |
| 3,926,063 A * | 12/1975 | Mayfield | ............... | 474/132 |
| 4,425,103 A * | 1/1984 | Foster | ............... | 474/138 |
| 4,767,385 A * | 8/1988 | Wilson | ............... | 474/138 |
| 4,969,859 A * | 11/1990 | Holbrook | ............... | 474/138 |
| 5,323,739 A * | 6/1994 | Mollers | ............... | 474/136 |
| 5,938,551 A * | 8/1999 | Warner | ............... | 474/138 |
| 6,422,964 B1 * | 7/2002 | Rointru et al. | ............... | 474/138 |
| 6,607,459 B1 * | 8/2003 | Serkh et al. | ............... | 474/138 |
| 6,689,001 B2 * | 2/2004 | Oliver et al. | ............... | 474/134 |
| 2002/0039943 A1 | 4/2002 | Serkh | ............... | 474/134 |

FOREIGN PATENT DOCUMENTS

| | | | | |
|---|---|---|---|---|
| DE | 43451 A1 * | 6/1994 | ............... | 474/134 |
| JP | 58-152962 A * | 9/1983 | ............... | 474/134 |

* cited by examiner

*Primary Examiner*—Marcus Charles
(74) *Attorney, Agent, or Firm*—J. L. Mahurin, Esq.; J. A. Thurnau, Esq.; R. N. Dunlap, Esq.

(57) ABSTRACT

A belt tensioner for a belt drive system as a belt tensioner, a first belt tensioner pulley, a crankshaft pulley, an accessory pulley, and a power transmission belt trained about the first belt tensioner, crankshaft, and accessory pulleys. The belt tensioner is of the type that includes an attachment point adapted to be affixed to a stationary point relative to a cylinder block of an engine, a track, and a first carrier mounted in sliding relation with the track with two degrees freedom of movement. The first belt tensioner pulley is rotatably mounted upon the first carrier for engaging the power transmission belt. A resilient member biases the first carrier in longitudinal relation to the track. The tensioner further includes a travel limiting mechanism.

7 Claims, 18 Drawing Sheets

(START MODE)

(GENERATE MODE)

*(START MODE)*

*(GENERATE MODE)*

TRAVEL LIMITED LINEAR BELT TENSIONER

CROSS-REFERENCE TO RELATED APPLICATIONS

This application claims priority to U.S. Provisional Patent application Ser. No. 60/332,645, filed Nov. 6, 2001 and entitled Travel Limited Linear Belt Tensioner. The subject matter of this application is incorporated herein by this reference.

BACKGROUND OF THE INVENTION

1. Field of the Invention

This invention relates generally to a tensioner for tensioning a power transmission belt of a belt drive system. Particularly, it relates to a tensioner having a linear pulley movement. Specifically, this invention relates to a linear movement tensioner whose movement is mechanically damped and travel limited with included applicability to power transmission belt drive systems having a unitary device performing both the engine starting function and the electrical power generation function, such as a motor/generator sometimes referred to as a Gen-Star.

2. Description of the Prior Art

Internal combustion engines, or power plants, commonly use power transmission belt drive systems to tap power from the engine's crankshaft and deliver it to one or more various engine auxiliaries or accessories. In automotive applications, these accessories include power steering pumps, water pumps, air conditioning compressors, fuel pumps, and alternators. Historically, such engines have had the main power takeoff point at the crankshaft protruding from the rear of the engine to which is attached the drive train for driving the wheels to move the automobile. The accessories are driven from a pulley attached to the front of the crankshaft. Each accessory is equipped with a pulley. All of the pulleys are in mechanical communication via one or more power transmission belts trained about them. Some method of tensioning each power transmission belt is provided. The power transmission belt, the pulleys, and devices accomplishing belt tensioning form the accessory belt drive system.

Earlier systems included multiple v-belts. Commonly, each belt was tensioned by manual adjustment and fixing of the position of one accessory or idler per belt. These are referred to as locked-center belt drives, because there is no provision for automatic movement of any of the pulleys to accommodate varying condition of the belt or of the drive as a whole. If the belt should stretch or otherwise lengthen, the tension upon the belt would lessen. Further, for proper operation of the belt drive system, the tension of the belt must be set high enough to accommodate the worst case condition. Such worst case conditions can be the result of extremes of temperature, engine operation, or accessory operation.

There has been interest in making the volume, of the engine compartments of automobiles, smaller. To accommodate the smaller compartments, various aspects of the engines have become smaller, including the accessory belt drive systems. This has been accomplished, at least in part, by reducing the number of belts employed. As each belt is removed, and the number of layers extending from the front of the engine is thereby removed, the total distance the belt drive system extends from the front of the engine is reduced. Ultimately, this has resulted in the use of a single serpentine belt for many applications. A serpentine belt is so named because of the way it snakes around the various pulleys in a series of bends, both forward and backward. A v-ribbed or Micro-V (a registered trademark of The Gates Rubber Company) belt is most suited to serpentine applications.

The limitations of the locked-center approach to belt tensioning are exacerbated in serpentine applications. Accordingly, most modern serpentine belt drives include an automatic tensioner whereby the changing conditions of the belt drive system can be better accommodated. In basic form, an automatic tensioner has a framework or attachment point, which attaches directly to the cylinder block of the engine, or indirectly to some point on the vehicle that is stationary with respect to the engine of the vehicle, and a pulley, which presses upon the belt in the plane of rotation of the belt drive system. A moveable member or connective portion extends between the framework and the pulley to provide pressure upon the belt, via the pulley. The pressure acts to lengthen the distance about which the belt is trained and thereby causes the belt to be in tension. Various techniques and geometries have been employed to provide the biasing force. Commonly, a resilient member, such as a steel spring acts to force the moveable member in motion which results in the pulley tending to move in a direction toward a surface of the belt which, in turn, tends to increase tension upon the belt.

A tensioner with only these elements provides a somewhat constant force upon the surface of the belt when the system is in a resting state (i.e., the pulleys are not rotating). Dimensional instability, of the drive system caused by time, temperature, or manufacturing variation is accommodated fairly well through the action of the resilient member, at least to the limits of the resilient member and geometry of the tensioner. Thus, the tension upon the belt remains relatively constant, when the system is at rest, even though the belt may have stretched or the engine may be hot or cold. However, a tensioner with only these elements may not maintain appropriate tension upon the belt for all operating conditions of the system.

An operating power transmission belt drive system typically oscillates due to the influences of torsional vibration or other angular acceleration of the crankshaft or accessories, the influences of unbalanced conditions, or other influences. Torsional vibration of the crankshaft occurs, in part, as a result of the distinct impulses delivered to the crankshaft through the combustion cycles of each cylinder and piston combination. The oscillations lead to vibration of the belt. This, in turn, leads to vibration of the moveable portions of the tensioner. Momentum then builds in those moveable portions modifying the force the pulley exerts upon the belt surface and the tension upon the belt. The changing tension upon the belt can cause unacceptable performance for the belt drive system. In one instance, issues of short-term performance, such as where the belt of the belt drive system slips excessively limiting the system's efficiency or power transmission capability, or is excessively noisy due to slippage or otherwise, can arise. In another instance, the amount of tension necessarily applied to the belt, to have acceptable performance on the short-term, leads to long-term issues such as premature failure of one or more components of the system, including the belt, or one or more accessories.

To accommodate these issues and thus improve the performance of tensioners, damping devices have been included in tensioners. Early damped tensioners have included symmetrical damping where movement of the moveable portions of the tensioners are damped approximately equally whether the instantaneous movement is in the direction tending to increase tension upon the belt or in the direction tending to decrease tension upon the belt. Damping combines with the forces supplied by the resilient member to result in a modified biasing, at the pulley/belt interface.

Other tensioners have utilized asymmetrical damping. Commonly, such tensioners are damped such that the damping upon the moveable portion is minimal when the tensioner is moving in the belt tensioning direction and maximal when moving in the belt loosening direction. In one approach, a shoe is biased against a race at an angle different from normal to the surface of the race. As a result, the relative movement of the shoe and race in one direction tends to lift the shoe from the race. This reduces the pressure at their interface, reduces the friction that gives rise to the damping, and thereby reduces the damping. The other direction tends to wedge the shoe against the race and increase the damping. An example is described in U.S. Pat. No. 5,964,674, to Serkh et al. These have involved the use of tensioners having a single pulley biased against a surface of the belt, to supply tension. Further, the biasing against the belt has been solely relative to the engine block.

U.S. Pat. No. 4,416,647 to White, Jr. discloses the use of tensioners with two pulleys pressing upon the power transmission belt. The '647 patent states that the approach is useful for tensioning a system with a cyclic load such as an air conditioning compressor. One, of the pulleys, presses upon a span of the power transmission belt immediately upstream of the cyclic load. While, the other pulley presses upon the power transmission belt immediately downstream of the cyclic load. In one embodiment, the two pulleys are fixed relative to each other upon a angled member that can pivot about its apex. The assembly is pressed toward the power transmission belt to supply static tension in a locked-center fashion. The pivot is said to accommodate dynamic tension. Static tension is the result of the force applied to the power transmission belt by the tensioner in the belt tensioning direction with the effect of tending to lengthen the distance the power transmission belt is forced to travel about the pulleys of the system. If it were assumed that each of the pulleys of the system is allowed to rotate freely, tension on every span would be the same and at static tension. Dynamic tension is the tension over the length of the power transmission belt that is the result of static tension as altered by the influences of torque upon each of the pulleys and various imbalances of the system. As an additional result, each span tends to be under differing tension.

Power transmission belt tensioners used in conjunction with accessory belt drive systems for internal combustion engines are known with pulley movements that are both arcuate and linear. Those of the above discussion have all used arcuate movements. Certain applications benefit from linear movement tensioners (i.e., those where the idler pulley contacting the power transmission belt moves in a substantially straight path).

An example of a linear movement tensioner can be found in U.S. Pat. No. 4,634,408 to Foster. The '408 patent discloses the construction of a relatively complex tensioner that incorporates a plurality of springs about a hydraulic damping mechanism. The tension upon the belt is adjustable by bolts that define the level of compression applied to the springs. The carrier, upon which the tensioning pulley is mounted, engages the track, that defines the carriers two degrees of freedom of movement, with a ball and track bearing structure. All of this, has inherent limits of travel, as with all mechanical structures. However, there is no intentional travel limitation disclosed. Further, there is no disclosure of travel limitation structure or technique to accommodate a controlled deceleration if the tensioner reaches the limit of it travel. It is common in the art, of tensioners for belt drive systems, for tensioners to be designed to have adequate travel in their movements to never reach the limit of their travel in normal belt system operation. The '408 patent does not suggest that the disclosed tensioner is contemplated to be any different. The inclusion of hydraulics creates the concern of leaking hydraulic fluid. The hydraulic mechanism disclosed is apparently not compact. Thus, the tensioner appears to be relatively large. The relatively large number of parts adds to cost and complexity of construction. Further, there is no provision for compensating for the parasitic torque across the carrier that supports the idler pulley, which tends to twist that carrier, other than the effectiveness of the ball and track bearing structure.

Traditionally, an electric starter motor is provided to spin the crankshaft of the engine so that combustion may be initiated and the engine will begin to run. The starter motor is located near the rear of the engine and is adapted to intermittently engage the rear portion of the crankshaft through a gear train.

Currently, there is increasing pressure to reduce emissions and increase fuel economy by lowering the weight of the automobile and reducing the number of under-the-hood components. An approach taken toward these goals involves combining the function of the starter motor and the function of the alternator into a single device, a motor/generator or a Gen-Star. Also toward the goal of increasing fuel economy, the Gen-Star promotes the use of a feature called "stop-in-idle". This feature is where the engine is allowed to die when it would ordinarily idle, then be restarted when the automobile is expected to resume motion. This feature substantially increases the demands placed upon accessory belt drives. In application, the motor/generator is placed in mechanical communication with the crankshaft via the accessory belt drive. The motor/generator and associated accessory belt drive system tends to be placed at the front of the engine. However, placing these systems at other locations, including the rear of the engine is envisioned.

The advent of Gen-Star systems causes the designer, of power transmission belt drive systems, to face substantial new challenges, above mere oscillatory loads. A significant challenge, among these, has been to develop a tensioning system that results in acceptable performance, by an accessory belt drive that includes this new device, which not only offers substantial load and rotational inertia, but also adds large driving torque into the accessory belt drive. Further, it provides this large driving torque on an intermittent basis.

It has been discovered that for various layouts of belt drive systems incorporating a linear movement tensioner and a motor/generator that the inclusion of damping, especially asymmetric damping, can positively affect both short-term and long-term performance of such a belt drive system. It has also been discovered that placing specific limits on the travel of the tensioner in the belt loosening direction can positively affect both short-term and long-term performance of such a belt drive system. This can be true even where a system does not include a motor/generator. However, deleterious side effects caused by such a travel limitation include undesirable belt and other system noise, when the limits are reached.

U.S. Pat. No. 4,758,208 to Bartos et al., discloses the use of two arms with arcuate movements, each carrying a pulley. The arms are mounted with pivot points that correspond with the shaft of a motor/generator. The two arms are biased toward each other by a spring. The tensioner also includes having the motor/generator mounted in a limited rotatable fashion such that the housing is allowed to rotate a few degrees in reaction to whether the motor/generator mode is of operating as a starter or an alternator. This reactive movement operates a pair of latches, which alternatingly lock one or the other of the two arms against movement, depending upon mode. In this manner, the arm associated with the power transmission belt span terminating at the motor/generator pulley with the greatest tension, as a result of the motor/generator mode, is locked in place. The free arm then supplies tension to the power transmission belt system. This tensioner is apparently complex, requires special mounting of the motor/generator having moving parts subject to wear, and is not flexible in its application. Further, the '208 patent does not disclose the contemplation of adding damping to the movement of either pulley to enhance system performance. Also, it does not disclose a travel limiting structure that is either resilient, cooperates with a damping mechanism, or suggests an attempt at overcoming the previously described deleterious side effects.

Installation of a linear tensioner having specific travel limits can also be enhanced by making those specific limits adjustable on a case-by-case basis and by providing a release mechanism that can be selectively released upon installation of the belt. Further, tension decay characteristics of the belt can be better accommodated where the adjusters providing the adjustable specific limits can be preset to provide an initial locked-center tensioner adjustment.

Accordingly, there is a continuing need for a linear movement tensioner that is travel limited while avoiding deleterious side effects in operation for those applications that can benefit therefrom. An accessory power transmission belt drive system having a motor/generator is one such application.

There is a continuing need for a linear tensioner having travel limits that are adjustable, or can provide an initial locked-center tension, or both. There is also a continuing need for a linear tensioner having a release mechanism.

Further, there remains the need for a tensioner and system, for use in conjunction with a motor/generator that provides, at once, adequate short-term performance, adequate long-term performance, optimizes the width of the belt that may be used for any given application, contains cost and complexity, is flexible according to the motor/generator systems to which it can be applied and offers a linear movement.

SUMMARY OF THE INVENTION

The present invention has as an object the provision of a linear accessory power transmission belt drive tensioner, a system of a configuration, an engine utilizing the same, and method for their use, that improves the combination of short-term performance, long-term performance, and optimizes belt selection.

The present invention has as an object the provision of a linear movement tensioner with specific limits adjustable on a case-by-case basis The present invention has as an object the provision of a linear movement tensioner with a release mechanism that can be selectively released upon installation of the belt.

The present invention has as a further object the provision of a linear movement tensioner where the adjusters providing the adjustable specific limits can be preset to provide an initial locked-center tensioner adjustment.

To achieve the foregoing and other objects in accordance with the purpose of the present invention, as embodied and broadly described herein the invention is an improved belt tensioner for a belt drive system having a belt tensioner, a first belt tensioner pulley, a crankshaft pulley, an accessory pulley, and a power transmission belt trained about the first belt tensioner, crankshaft, and accessory pulleys. The belt tensioner is of the type that includes an attachment point adapted to be affixed to a stationary point relative to a cylinder block of an engine, a track, and a first carrier mounted in sliding relation with the track with two degrees freedom of movement. The first belt tensioner pulley is rotatably mounted upon the first carrier for engaging the power transmission belt. A resilient member biases the first carrier in longitudinal relation to the track. The improvement comprises the tensioner including a travel limiting mechanism.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings.

DETAILED DESCRIPTION OF THE PREFERRED EMBODIMENTS

Figure 1:
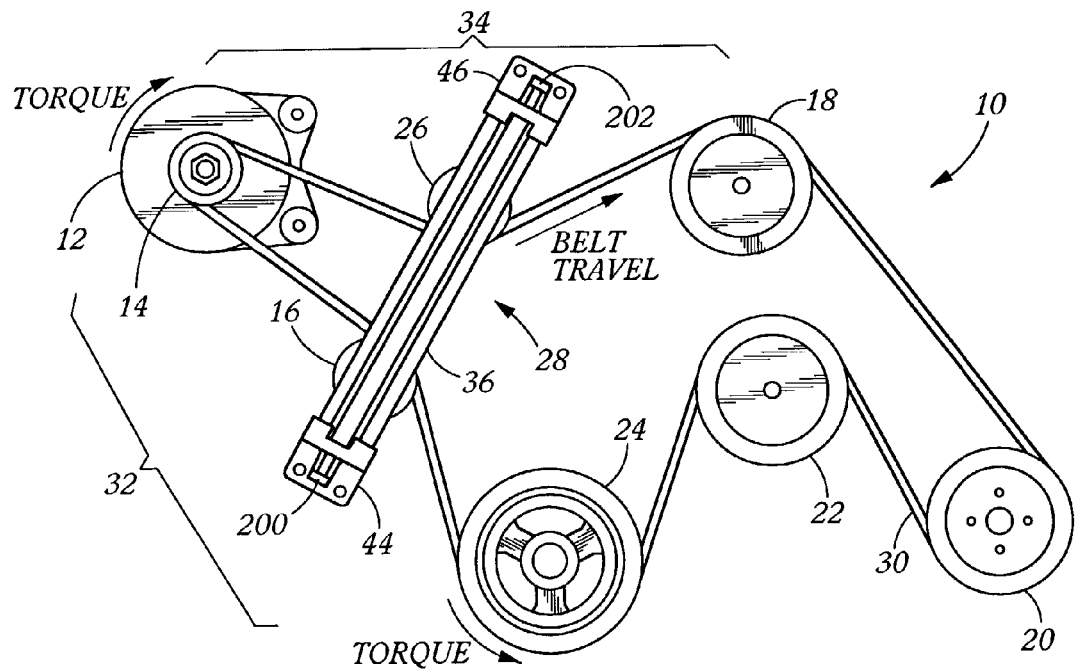
FIG. 1 is a schematic representation of a preferred embodiment of an accessory belt drive system configuration including a linear movement tensioner and a motor/generator with the system in the start mode.
Figure 2:
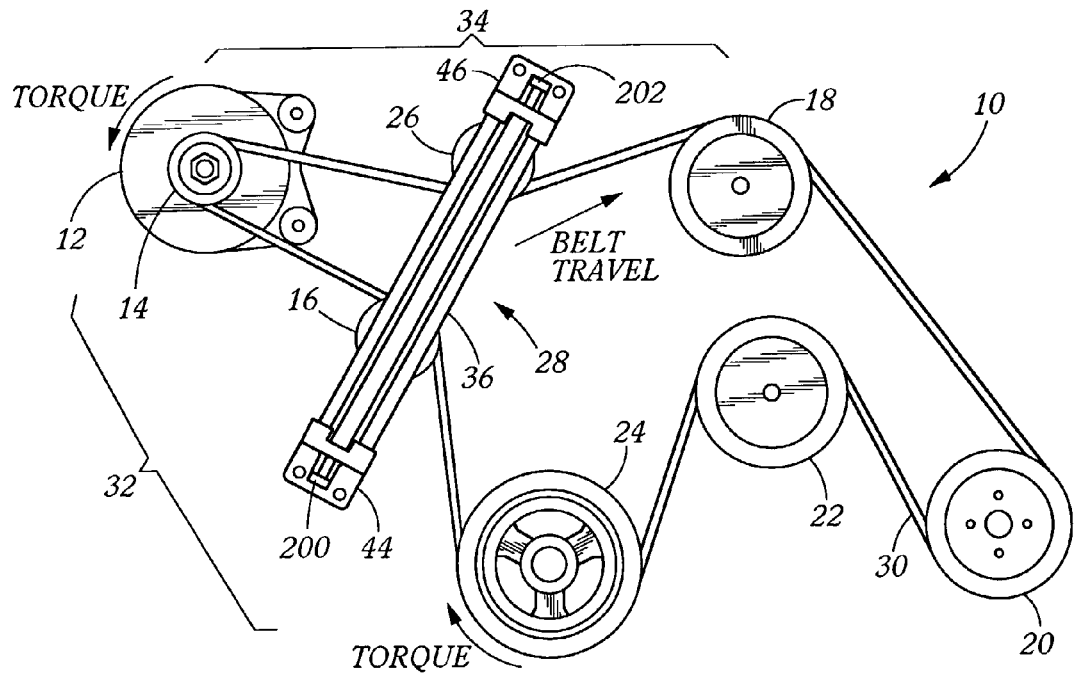
FIG. 2 is a schematic representation of a preferred embodiment of an accessory belt drive system configuration including a linear movement tensioner and a motor/generator with the system in the generate mode.

A preferred embodiment of an accessory belt drive system 10 is depicted in FIGS. 1 and 2. It includes motor/generator 12, motor/generator pulley 14, power steering pump pulley 18, air conditioning compressor pulley 20, water pump pulley 22, crankshaft pulley 24, dual tensioner 28, first tensioner pulley 16, second tensioner pulley 26, and power transmission belt 30.

While specific accessory pulleys in a specific geometrical arrangement are depicted, it should be recognized that the instant invention applies to various numbers and combinations of accessories and geometrical arrangements, including both serpentine and non-serpentine configurations, depending upon application. While significant advantages can be obtained for a system including motor/generator 12, the accessory could also be an ordinary alternator or other accessory. Commonly, the accessory 14 will be presenting high oscillatory loads to take advantage of the benefits of tensioner 28 of the instant invention. The configuration depicted is serpentine. Thus, power transmission belt 30 would ordinarily be of the v-ribbed type. However, the invention can be practiced with the inclusion of all belt types. Further, this depiction also can be viewed as one plane of belt/pulleys in an accessory belt drive system having multiple belts.

The arrow labeled "belt travel" indicates direction of belt travel during normal operation in both generate and start modes. To move downstream, along the path trained by power transmission belt 30, is to move in the same direction as belt travel. To move upstream is to move in the opposite direction of belt travel.

Moving downstream starting at crankshaft pulley 24, a start-tight-side span 32 covers the distance beginning with a termination at the last point of contact between crankshaft pulley 24 and power transmission belt 30, and ending with a termination at the first point of contact between motor/generator pulley 14 and power transmission belt 30. Start-tight-side span 32 is the span with normally the greatest tension of the system when the engine is being started by motor/generator 12, the start mode. A start-slack-side span 34 covers the distance beginning at the last point of contact between motor/generator pulley 14 and power transmission belt 30 and ending at the first point of contact of power steering pump pulley 18 and power transmission belt 30. Generate-tight-side span 34 is the span with normally the least tension of the system when the engine is in normal operation, generate mode.

The direction of torque at motor/generator pulley 14 and at crankshaft pulley 24 reverses depending upon the mode of operation of accessory belt drive system 10, as depicted by the arrows labeled "torque" at each pulley 14 and 24, in FIGS. 1 and 2, respectively. In the generate mode, crankshaft pulley 24 supplies all driving torque. Water pump pulley 22, air conditioning compressor pulley 20, power steering pump pulley 18, and motor/generator pulley 14 consume the driving torque, with minor consumption by first tensioner pulley 16 and second tensioner pulley 26. In start mode, motor/generator pulley 14 supplies all driving torque. Crankshaft pulley 24, water pump pulley 22, air conditioning compressor pulley 20, and power steering pump pulley 18 consume the driving torque, with minor consumption by first tensioner pulley 16 and second tensioner pulley 26.

Generally and regardless of mode of operation, if it were assumed that each of the pulleys is allowed to rotate freely, tension on every span would be the same and at static tension. Referring to FIGS. 1 and 2 and 5 through 11, for this preferred embodiment, static tension is the result of the force applied to power transmission belt 30 by tensioner 28 through the resilient member 38 acting upon the combination of first pulley carrier 40 and second pulley carrier 42 causing first tensioner pulley 16 and second tensioner pulley 26 to be biased toward each other, or mutually biased, and pressing upon the combination of start-tight-side span 32 and start-slack-side span 34, which in turn tends to lengthen the distance power transmission belt 30 is forced to travel about all of the pulleys.

In the conventional or generate mode, depicted in FIG. 2, crankshaft pulley 24 supplies the driving torque. Each pulley upstream of crankshaft pulley 24 absorbs a portion of the driving torque and, ignoring the affects of the tensioner, causes the tension in the immediately upstream span to be reduced. Motor/generator pulley 14 presents the greatest load. Ultimately, start-tight-side span 32 becomes the span with the least tension.

In the start mode, depicted in FIG. 1, motor/generator 12 supplies the driving torque. Start-tight-side span 32 becomes the span with the greatest tension. Starts-slack-side span 34 becomes the span with the least tension. Unlike the generate mode, crankshaft pulley 24 presents the greatest load. Traditionally, optimization is viewed as a function of sequencing the various loads and placement of the tensioner, of the drive layout. As can be seen, a layout that optimizes in the generate mode is substantially different from a layout that optimizes in the start mode.

In the conventional accessory v-ribbed belt drive system, the fundamental design considerations are: 1) belt width (commonly denoted by number of ribs) and type selection related to torque anticipated to be supplied and consumed; and, 2) static tension selection to be below that which stresses either the belt or components of the system to the point of reducing the useful life of either below an acceptable term and above the point where unacceptable slippage begins. Further, belt type and width selection affects useful belt life. Also, there is interplay between these two fundamental design considerations.

A constant goal for the accessory belt drive system designer is to optimize both of these considerations, in light of cost and complexity concerns. Optimization is accomplished through manipulation of many geometric and material parameters known to those of ordinary skill in the art. Among these is arrangement of the driving and driven pulleys based upon inertial or other torque each presents.

Drive systems that include a motor/generator never allow this particular optimization, and present new and difficult limitations. The root of the difficulties lies in the fact that the pulleys, which supply the driving torque and present the greatest inertial torque are different depending upon mode of operation. Further, larger inertial torque loads are presented than normally encountered in a conventional drive system.

The two pulley tensioner 28 of the instant invention significantly optimizes accessory belt drive system 10 in certain applications for the combination of modes, particularly when used in the layout of the preferred embodiment. Tensioner 28 is not limited to this particular layout, however. A power transmission belt system 10, which includes a motor/generator, has been chosen as an example of the applicability of tensioner 28 of the instant invention due to the severe duty the motor/generator accessory represents. However, as stated earlier, tensioner 28 and all the alternates disclosed herein, have wide applicability to power transmission systems 10 for automotive and industrial internal combustion engine, across the board.

The belt loosening direction, when referring to each first or second pulley 16 or 26 individually, is that direction, of either first or second pulley 16 or 26, that tends to allow belt 30 to be trained about a shorter path. The belt tensioning is simply the converse. However, when referring to the movement of first and second pulleys 16 and 26, the belt loosening direction is when first and second pulleys 16 and 26 move farther apart. Once again, belt tensioning is simply the converse.

First and second tensioner pulleys 16 and 26 follow linear travels along track 36, described in greater detail below. It is preferred that the linear path of each first and second pulleys 16 and 26 be oriented perpendicular to the path the associated span would assume if taut between the pulleys at either end of the span, in this case alternator pulley 14 and crankshaft pulley 22 for first tensioner pulley 16 and motor/generator pulley 14 and power steering pump pulley 18 for second tensioner pulley 26, but for the presence of tensioner 28. This orientation minimizes the movement of first and second tensioner pulleys 16 and 26 for any given belt deflection, thus reducing the necessary length of track 36 and allowing tensioner 28 to be more compact overall, and improves the force relationships within tensioner 28 to allow optimal longevity of the internal features of tensioner 28. However, it is recognized that certain applications, such as that depicted, may not allow this orientation. Satisfactory results may still be obtained in those applications.

The internal features of tensioner 28 will now be described referring to FIGS. 5 through 11. In this preferred embodiment, first end support 44 includes first attachment holes 56 to accept fasteners, not depicted, for attaching tensioner 28 to the engine. Second end support 46 includes second attachment holes 58 to accept fasteners, not depicted, for attaching tensioner 28 to the engine. It can be seen that the portions of first end support 44, having first attachment holes 56, and second end support 46 having second attachment holes 58 each project away from first and second tensioner pulleys 16 and 26 and have bottom surfaces approximately aligned on the same plane as the bottom surface of first and second tensioner pulleys 16 and 26. However, any configuration, where first and second end supports 44 and 46 find attachment to the engine while supporting track 36 in proper orientation to power transmission belt 30, is contemplated.

Figure 20:
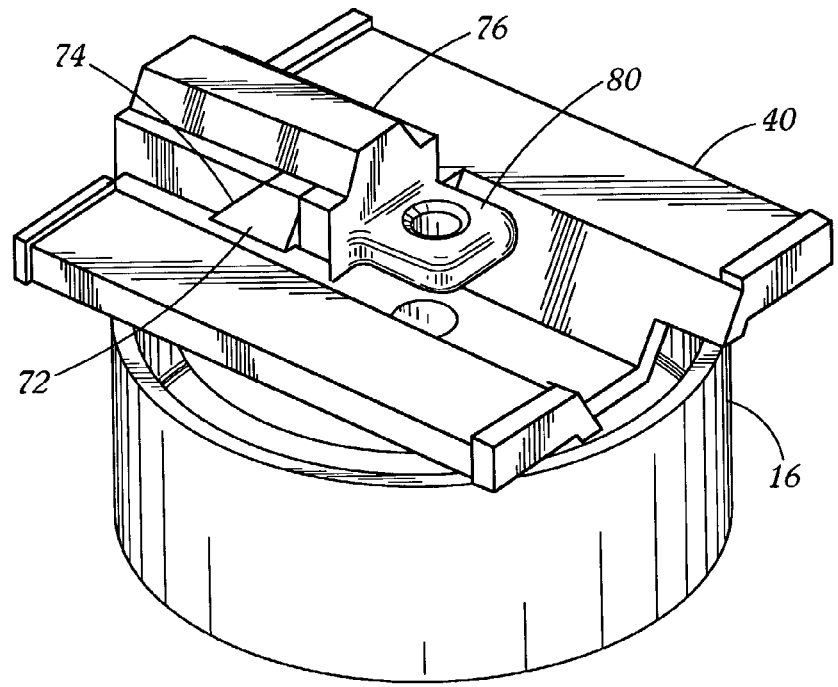
FIG. 20 is a detail of a portion of a preferred embodiment of a tensioner in perspective view.
Figure 21:
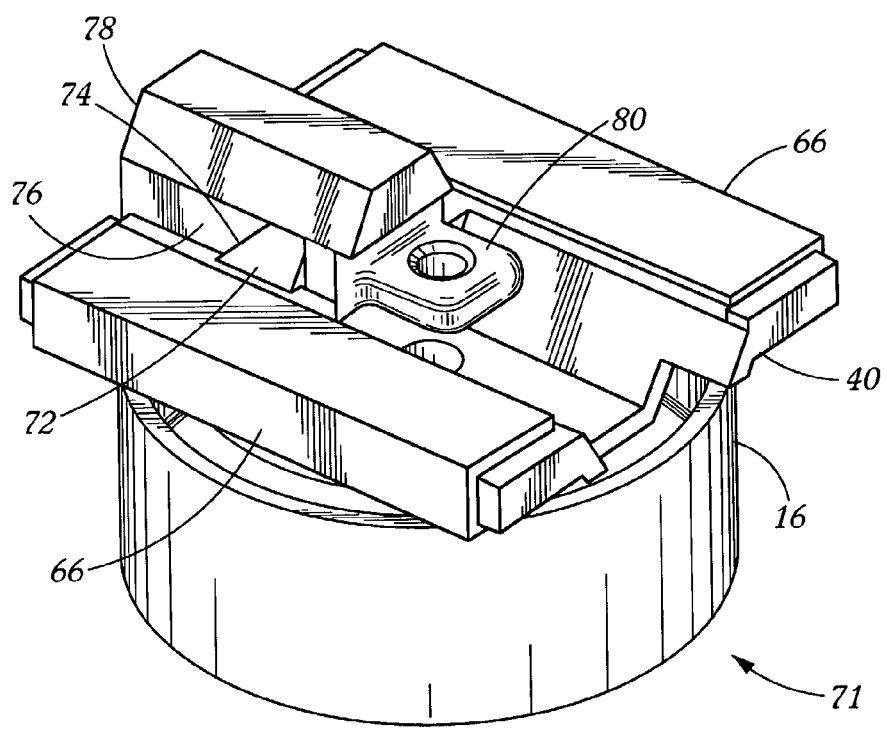
FIG. 21 is a detail of a portion of a preferred embodiment of a tensioner in perspective view.

Track 36 includes carrier support channels 68 and damping channel 70. Each of first and second pulley carriers 40 and 42, detailed in FIGS. 20 and 21, includes carrier bearings 66, which ride within carrier support channels 68. First and second tensioner pulleys 16 and 26 are rotatably affixed to first and second pulley carriers 40 and 42 by and journaled upon bolts 60 via ball bearing assembly including races 62 and balls 64. First and second pulley carriers 40 and 42 also include first and second angled blocks 72 and 73, respectively, which may be by integral casting or by joining of separate pieces. First and second shoes 76 and 77 are placed upon first and second pulley carriers 40 and 42, respectively, and about first and second angled blocks 72 and 73, respectively, in a manner that allows first and second shoes 76 and 77 to slide over first and second angled blocks 72 and 73 at first ands second angled junctions 74 and 75. First and second shoes 76 and 77 include first and second shoe bearings 78 and 79, which ride within respective damping channels 70. First and second shoes 76 and 77 have moveable first and second spring loops 80 and 81 through which first and second spring hooks 90 and 92 attach, respectively. Laterally to the left, first adjusting bolt 200 is threaded through first end support 44. The tip of first adjusting bolt 200 has a first bumper 210 of high modulus rubber. First auxiliary spring 220 spans from first end support 44 to first shoe 76. Laterally to the right, second adjusting bolt 202 is threaded through second end support 46. The tip of second adjusting bolt 202 has a second bumper 212 of high modulus rubber. Second auxiliary spring 222 spans from second end support 46 to second shoe 77. First and second installation pins 300 and 310 are inserted into first and second pin holes 312 and 314, respectively.

Once first and second tensioner pulleys 16 and 26 with bearings comprising races 62 and balls 64, are bolted upon first and second pulley carriers 40 and 42, carrier bearings 66 are affixed in place, and first and second shoes 76 and 77 with first and second shoe bearings 78 and 79 attached are placed upon first and second pulley carriers 40 and 42 (carrier assemblies 71) spring 38 is attached at first and second moveable spring loop 80 and 81 and carrier assemblies 71 are inserted into track 36. Carrier bearings 66 mate with carrier support channels 68 to create a low friction junction that allows only substantially longitudinal movement of the assembly, within track 36. The relationship between carrier bearings 66 and carrier support channels 68 determine the two degrees of freedom of movement of carrier assemblies 71. Tension from spring 38 causes each of the carrier assemblies 71 to rest against first and second installation pins 300 and 310.

Figure 6:
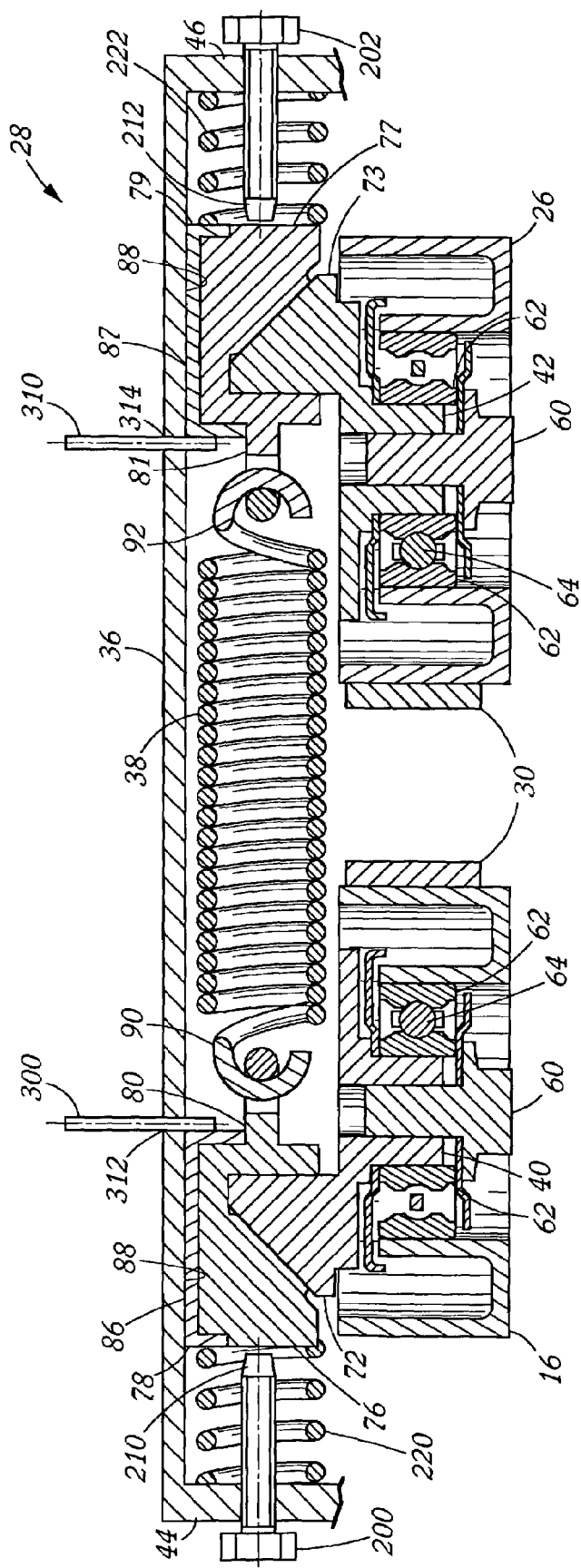
FIG. 6 is a partial section from FIG. 5 taken along line 5-5, depicting a cocked position.
Figure 7:
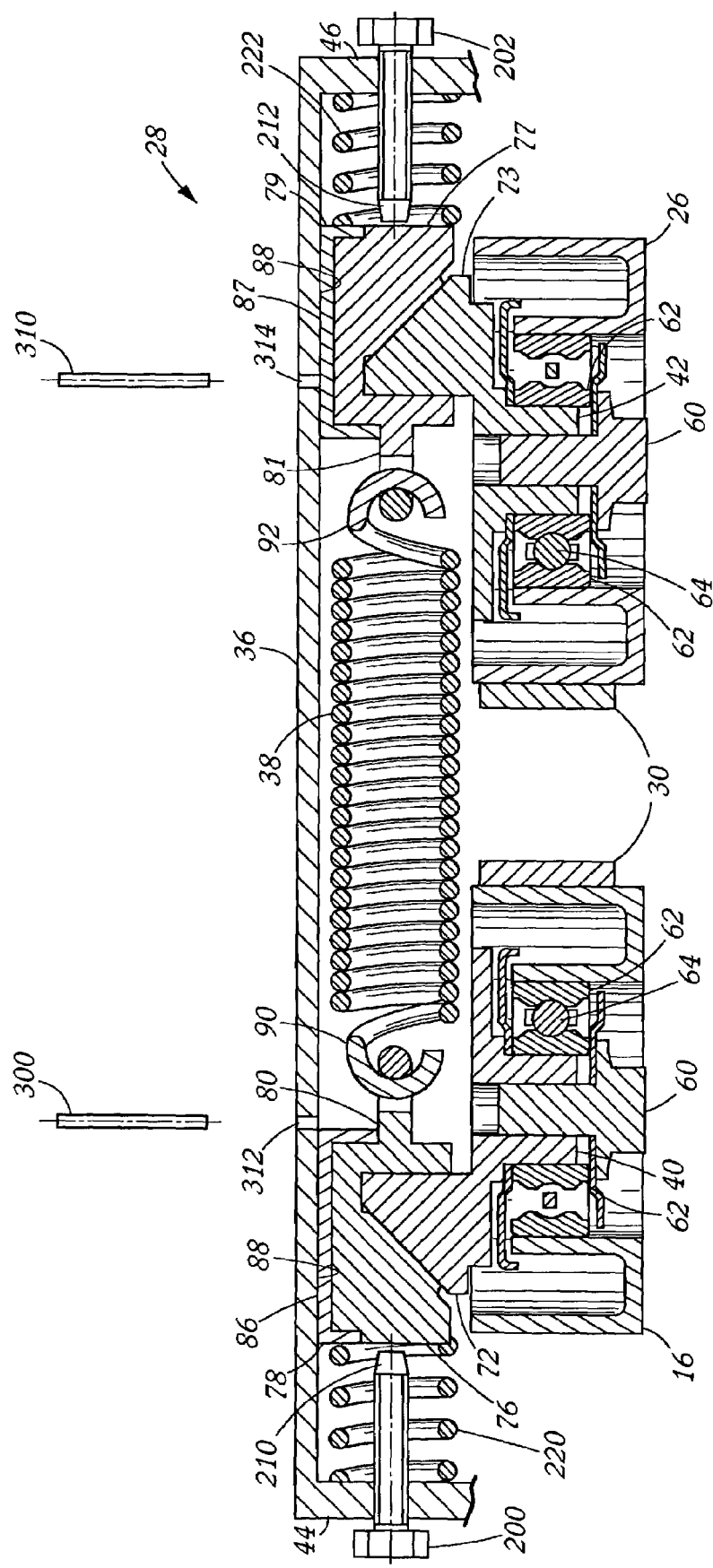
FIG. 7 is a partial section from FIG. 5 taken along line 5-5, depicting a release position with a new belt (with adjusting bolt compensated belt length variation).

First and second adjustment bolts, 200 and 202, are assembled with first and second bumpers, 210 and 212, respectively. First and second adjustment bolts 200 and 202 are threaded into first and second end supports 44 and 46, respectively. First and second auxiliary springs 220 and 222 are placed over first and second adjustment bolts 200 and 202, respectively. First and second end supports 44 and 46 and first and second end caps 48 and 50 are placed over the ends of track 36. Fasteners (not depicted) are then inserted through first and second cap attachment points 52 and 54, respectively, and compatible threaded openings in first and second end supports 44 and 46 and track 36 to join all five items. Referring to FIG. 6, at initial installation of belt 30, adjustment bolt 200 is slightly retracted from first damping shoe 76. However, first auxiliary spring 220 spans out against first shoe 76 and is under compression. At initial installation of belt 30, adjustment bolt 202 is slightly retracted from second damping shoe 77. However, second auxiliary spring 222 spans out against first shoe 77 and is under compression.

Tensioner 28 is then affixed to the engine. A new belt 30 is trained about the working pulleys comprising motor/generator pulley 14, power steering pump pulley 16, air conditioning compressor pulley 18, water pump pulley 20, and crankshaft pulley 22, and first and second tensioner pulleys 16 and 26 in the manner depicted in FIGS. 1 and 2. Installation pins 300 and 310 are pulled from pin holes 312 and 314, respectively. Tensioner 28 then assumes the position depicted in FIG. 7. The pulleys 16 and 26 are relatively far apart because belt 30 is new and has not yet stretched. Adjusting bolts 200 and 202 are then tightened appropriately, depending on the needs of system 10 and the construction of chosen belt 30. Generally, bolts 200 and 202 are threaded until bumpers 210 and 212 are just short of meeting shoes 76 and 77, respectively. However, in certain situations there may be an advantage in one or both tightening adjustment bolts 200 and 202 to provide additional bias or to create an initial set-up that is very similar to a locked-center belt drive system.

Figure 19:
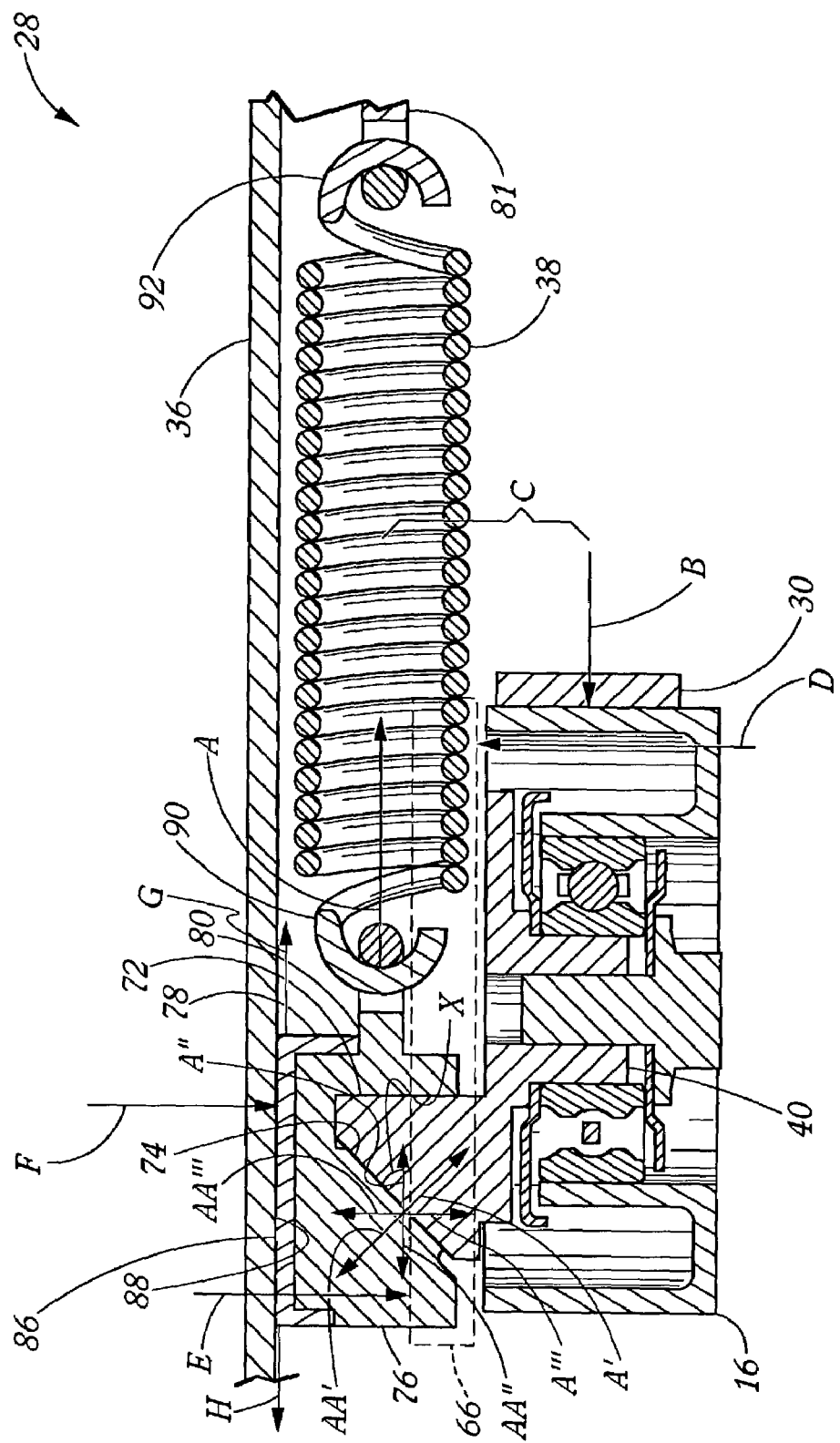
FIG. 19 is a partial section depicting forces acting upon either of the preferred embodiments of tensioner.

FIG. 19 assists in describing the forces that act within tensioner 28. Only one of carrier assemblies 71 is depicted and described. However, the description is equally applicable to all carrier assemblies 71 of this embodiment and of the alternate embodiments described below. Now referring to FIG. 19, once belt 30 is thus trained, the installation pins 300 and 310 are released allowing spring force A of springs 38 and 220 to be transmitted to belt 30 via first and second tensioner pulleys 16 and 26. It should be noted that the arrow associated with each of the described forces schematically denotes approximate direction and location but not magnitude. Further, forces that may actually be distributed over an area or among multiple members such as leveling forces D and E, will be presented as occurring at single points to simplify discussion and to enhance ease of understanding of the significant operations within tensioner 28. Power transmission belt 30 is thus brought to static tension. This gives rise to the belt force B upon first tensioner pulley 16 by power transmission belt 30. Moment C between forces A and B gives rise to a parasitic torque that tends to twist carrier assembly 71. The parasitic torque, in turn, gives rise to leveling forces D and E at the points of contact between carrier bearings 66 and carrier support channels 68, which prohibit continued twisting of carrier assembly 71 beyond the play between carrier bearings 66 and carrier support channels 68.

During operation of system 10, static tension is maintained by operation of springs 38, 220 and 222. Static tension is the result of the force applied to power transmission belt 30 by tensioner 28 via first and second tensioner pulleys 16 and 26 being biased in the belt tensioning direction with the effect of tending to lengthen the distance power transmission belt 30 is forced to travel about all of the pulleys 14, 16, 18, 20, 22, 24, and 26. If it were assumed that each of the pulleys 14, 16, 18, 20, 22, 24, and 26 is allowed to rotate freely, tension on every span would be the same and at static tension. However, variable torque upon each of the working pulleys 14, 16, 18, 20, and 22 causes tensions upon the spans in contact with first and second tensioner pulleys 16 and 26 to vary in an oscillatory manner. Carrier assemblies 71 react commensurately. In certain applications, this may lead to a dynamic tension that departs from the static to a degree that is unacceptable and a system 10 with poor performance. Dynamic tension is the tension over the length of belt 30 that is the result of static tension as altered by the influences of various imbalances and of torque upon each pulley 14, 18, 20, 22, and 24, and as altered by the reaction of tensioner 28 to those influences.

This issue of poor performance is resolved, in part, through the addition of damping to tensioner 28. Asymmetrical damping is particularly effective in compensating for oscillatory tension. Generally, asymmetrical damping is where the damping level for one direction of movement of either carrier assembly 71 is significantly different from the damping level in the other direction of movement of each. For the instant preferred embodiment, damping is greater when either carrier assembly 71 is moving in the belt loosening direction than when either carrier assembly 71 is moving in the belt tensioning direction.

The damping for tensioner 28, of all preferred embodiments depicted in the figures, is provided by the damping elements comprising damping channel 70, first angled block 72, first angled junction 74, first shoe 76, and first shoe bearing 78. Referring to FIG. 19, when carrier assembly 71 moves to the left, it is moving in the belt loosening direction. To the right is the belt tensioning direction.

When system 10 is assembled but not operating, carrier assembly 71 will be at rest and spring 38 will be partially extended, while first and second auxiliary springs 220 and 222 will be partially compressed. Spring force A and belt force B will be in equilibrium. Spring force A is translated to first angled junction 74 as translated spring force A' and its longitudinal component A", and vertical component A''' and gives rise to reactionary spring force AA' and its longitudinal component AA" and vertical component AA'''. Reactionary vertical component AA''' forces first shoe friction bearing surface 86 into engagement with track friction bearing surface 88. This in turn gives rise to downward force F.

Once system 10 begins operating, dynamic tension will alter belt force B and cause carrier assembly 71 to move. During those periods when belt force B grows and causes carrier assembly 71 to move in the belt loosening direction, friction is generated at the interface of first shoe friction bearing surface 86 and track friction bearing surface 88. This friction generates loosening damping force G. This force is translated to first angled junction 74 and joins with spring force A to increase the magnitude of longitudinal component A". This indirectly increases the magnitude of reactionary vertical component AA''' and downward force F, which is another way of stating that the mating force across the interface of first shoe friction bearing 86 and track friction bearing surface 88 is increased. This increase, in turn, sets-up a feedback loop which increases loosening damping force G. In sum, damping friction rises when carrier assembly 71 is forced in the belt loosening direction. The converse occurs in the belt tensioning direction.

In the depicted preferred embodiments, the angle X of first angled junction 74 is approximately 45°. Angle X can be adjusted to alter the level of damping asymmetry to accommodate differing applications. As angle X approaches 90°, asymmetry approaches zero. Asymmetry rises as angle X diminishes. However, there is point at which too low an angle X results in a non-functioning tensioner, due to jamming of the mechanism or degradation of structural integrity.

Longitudinal placement of first angled block 72, in relation to first pulley carriers 40, is significant to wear patterns and durability of carrier bearings 66. As discussed above, spring force A and belt force B acting about moment C results in parasitic torque upon carrier assembly 71, clockwise in FIG. 19. This is countered by first and second leveling forces D and E. Movement of carrier assembly 71 under the effects of dynamic tension or otherwise, in conjunction with leveling forces D and E, form the predicate for wear of carrier bearings 66. Ignoring the effects of downward force F and vertical component A''', it can be seen that greatest wear of carrier bearings 66 would occur at the points where leveling forces D and E fall upon carrier bearings 66. Wear of carrier bearings 66 will be the greatest at the lower right and upper left edges. This wear will tend to allow carrier assembly 71 to twist within track 36, over time. The twisting will tend to concentrate the wear patterns, further exacerbating the uneven wear and the speed with which the wear will occur.

Placement of first angled block 72 determines the location of downward force F and vertical component A'''. If first angled block 72 were placed upon first carrier 40 such that placement of vertical component A''' coincided with the far right edge of carrier bearings 66, then the immediately preceding discussion that ignored the effects of downward force F and vertical component A''' would apply to tensioner 28. However, as first angled block 72 is placed more to the left of first carrier 40, it increasingly displaces the function of second leveling force E. This effect is significant in two aspects. One, once second leveling force E is completely displaced by vertical component A''', the tendency for increased wear at the upper left portion of carrier bearings 66 is essentially eliminated. Two, second leveling force E only exists when carrier bearings 66 is in contact with carrier support channels 68. Accordingly, as wear occurs, first carrier 40 twists increasingly far before second leveling force E participates in leveling first carrier 40 within carrier support channels 68. Vertical component A''' is not dependant in that fashion and is present at all times that spring force A is present. Thus, whenever vertical component A''' is left of the lower right edge of carrier bearings 66, it acts to level first carrier 40 at all times that spring force A is present, tending to maintain first carrier 40 level to track 36 and tending eliminate the uneven wear pattern and improve durability carrier bearings 66. The farther vertical component A''' is moved left, the more pronounced is the effect.

It is contemplated that first angled block 72 can be placed anywhere within the left and right extremes of first carrier 40, or even extended beyond its depicted longitudinal boundaries, and achieve a working tensioner 28. However, it is preferred to place first angled block 72 at a point where the wear along the lower portion of carrier bearings 66, that normally make contact with carrier support channels 68, is substantially uniform. This is a function of the magnitude of moment C, placement and magnitude of damping forces G and H, length of carrier bearings 66, coefficient of friction between carrier bearings 66 and carrier support channels 68, angle of angle X, coefficient of friction at first angled junction 74, surface area of first angled junction 74, and other factors.

First shoe friction bearing surface 86 and track friction bearing surface 88 shapes affect placement and magnitude of damping forces G and H. For the preferred embodiments depicted, they are truncated nested V's and not only perform friction control so as to affect forces G and H, but also perform a longitudinal alignment function between track 36 and first shoe 76. Various other shapes are contemplated including nested V's, a plurality of nested V's or truncated nested V's. Substantially rectangular shapes are also contemplated.

Toward the ends of controlling friction at first angled junction 74, various shapes and contours can be chosen for the surfaces at first angled junction 74. In the preferred embodiment depicted, the surfaces are flat and substantially rectangular. Having the surfaces as nested V's or a plurality of nested V's, similar to the working surfaces of a v-ribbed belt and associated pulley, can be incorporated to control frictional properties at first angled junction 74. The nested V's, singularly or plurally, can also provide a longitudinal alignment function between first pulley carrier 40 and first shoe 76. Various bearing configurations, not depicted, can be interposed at first angled junction 74, including friction reducing materials, lubricants, ball bearing assemblies, or roller bearing assemblies. Even parallel swing arm assemblies, which act across first angled junction 74 to separate first angled block 72 from first shoe 76 and thereby reduce friction and wear, can be attached at appropriate points upon the sides of first angled block 72 and first shoe 76. While each, of these approaches, controls friction and wear, they also add complexity and expense, to varying degrees and their appropriateness will be application specific.

If a more complex and expensive bearing assembly is chosen to replace the simple and economical carrier bearings 66, such as ball and track bearings, the effect of longitudinal location of first angled block 72 is less obvious. However, overall life of any bearing chosen and smoothness of operation can be affected.

Figure 8:
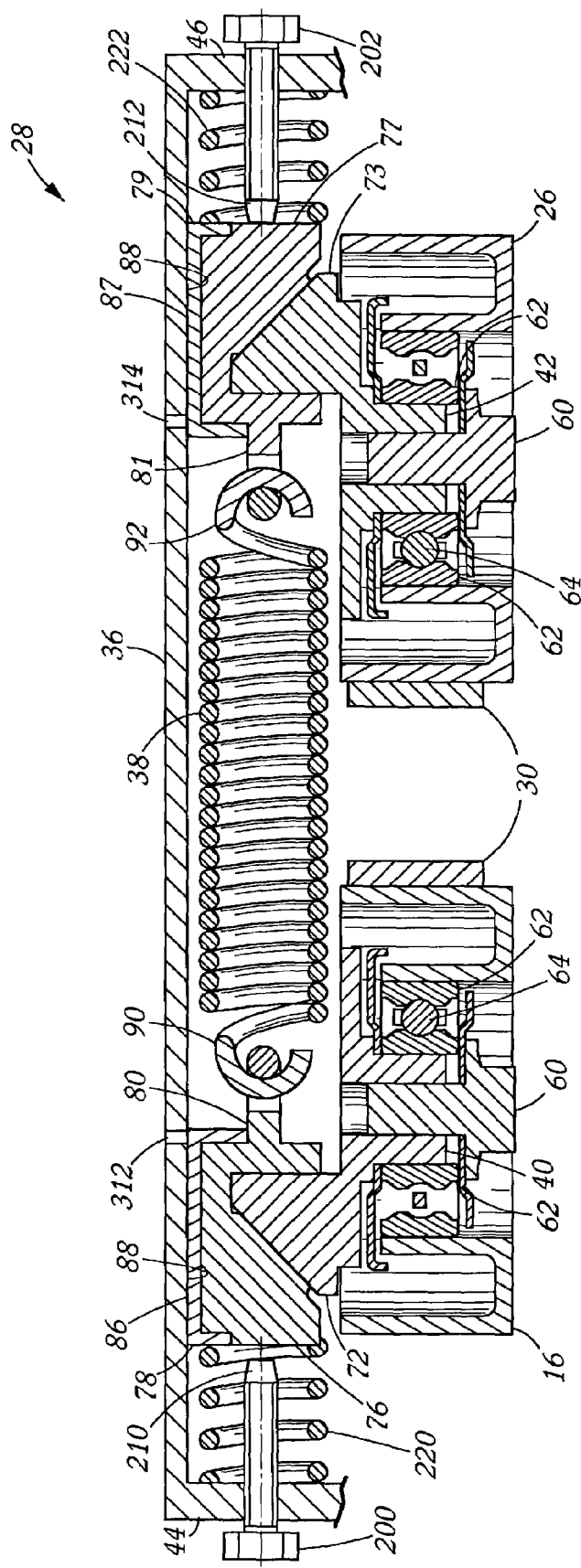
FIG. 8 is a partial section from FIG. 5 taken along line 5-5, depicting operation in the generate mode with new belt.

FIGS. 8 through 11 depict operation of tensioner 28 in both generate and start modes over time. In FIG. 8 it can be seen that the operation of belt drive system 10 in the generate mode causes start-slack-side span 34 to have relatively greater tension than start-tight-side span 32 and for pulley 26 to be pulled harder than pulley 16 by belt 30. If left unchecked by the stopping effect of second adjustment bolt 222 against second shoe 77, start-slack-side span 34 would straighten completely and the bend of start-tight-side span 32 would further exaggerate. This has been found to give rise to excessive variation of tensions over the various spans of belt 30 as between the generate and start modes of operation. Such excessive variation causes it to be necessary to set the initial static tension of system 10 at high levels to achieve adequate short term performance from system 10.

Initial static setting tension and resulting long term performance can be significantly enhanced by the addition travel limiting mechanisms, in this embodiment, the interrelation of first and second adjustment bolts 200 and 202, aided by first and second bumpers 220 and 222, with first and second shoes 76 and 77, respectively. Accordingly, in the generate mode, second shoe 77 will be driven against second bumper 212, as depicted in FIG. 8. An action such as this can give rise to unwanted noise and vibration within system 10. However, two aspects of this travel limiting mechanism avoid the unwanted noise and vibration. Primarily, the contact of second bumper 212 with second shoe 77 does not merely give rise to a such an increase force A (FIG. 19) as to stop continued movement of pulley 26 in the belt loosening direction. Rather, it leads to a somewhat dramatic increase of vertical component A''' and the resulting increase of mating force across the junction of first shoe friction bearing surface 86 and track friction bearing surface 88. This, in turn, leads to a proportional increase in loosening damping force G. The sharp rise in loosening damping force G commensurately reduces the impact produced upon second shoe 77 ramming against second bumper 212.

Secondarily, second bumper 212 is of a resilient material. The resilient material of the current embodiment is a high modulus rubber. However, other resilient materials are contemplated, such as steel spring, or a hydraulic or pneumatic bladder. Thus, the suddenness of the impact is substantially reduced by allowing the force necessary to stop the movement of carrier assembly 71 to be spread over a distance defined by the amount of compression the resilient material allows. The combination of the primary and secondary effects is particularly effective.

Figure 9:
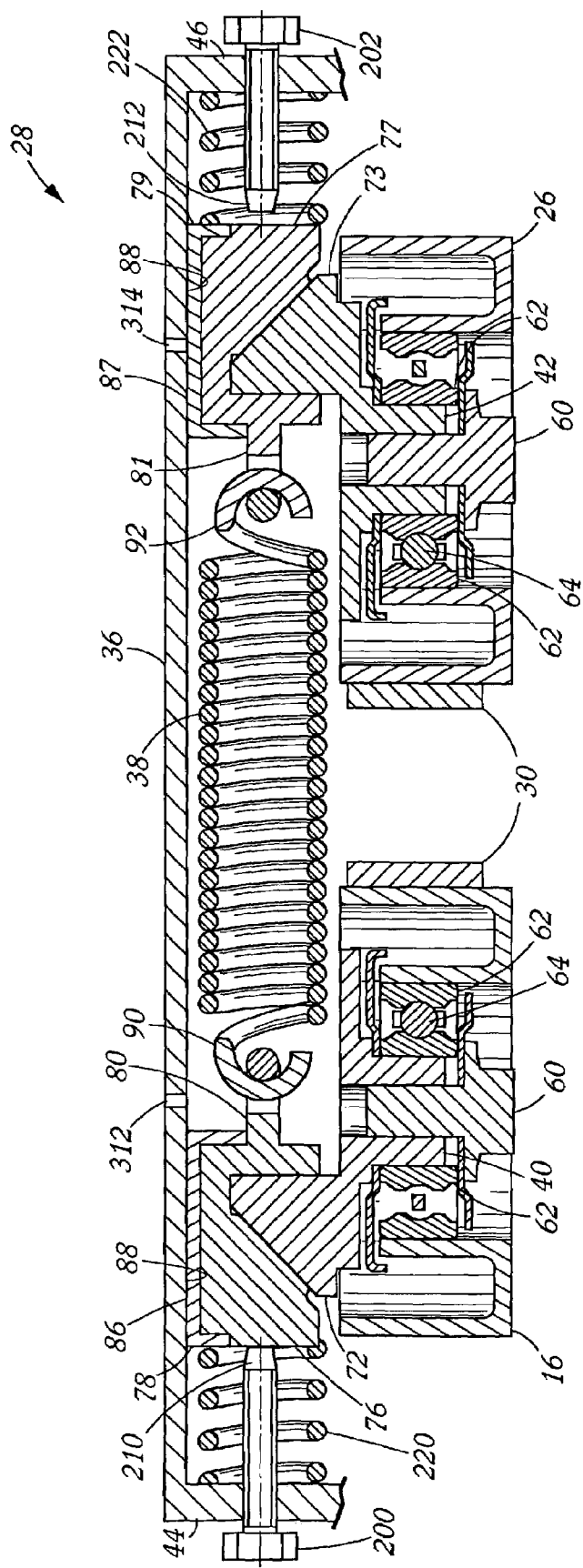
FIG. 9 is a partial section from FIG. 5 taken along line 5-5, depicting operation in the start mode with new belt.

FIG. 9 depicts the operation of tensioner 28 in the starting mode while belt 30 still has new dimensions. First shoe 76 is now pressed against first adjustment bolt 200 and associated first bumper 210. The operation that minimizes or eliminates the noise or vibration of system 10 described in conjunction with FIG. 8 applies here.

Figure 10:
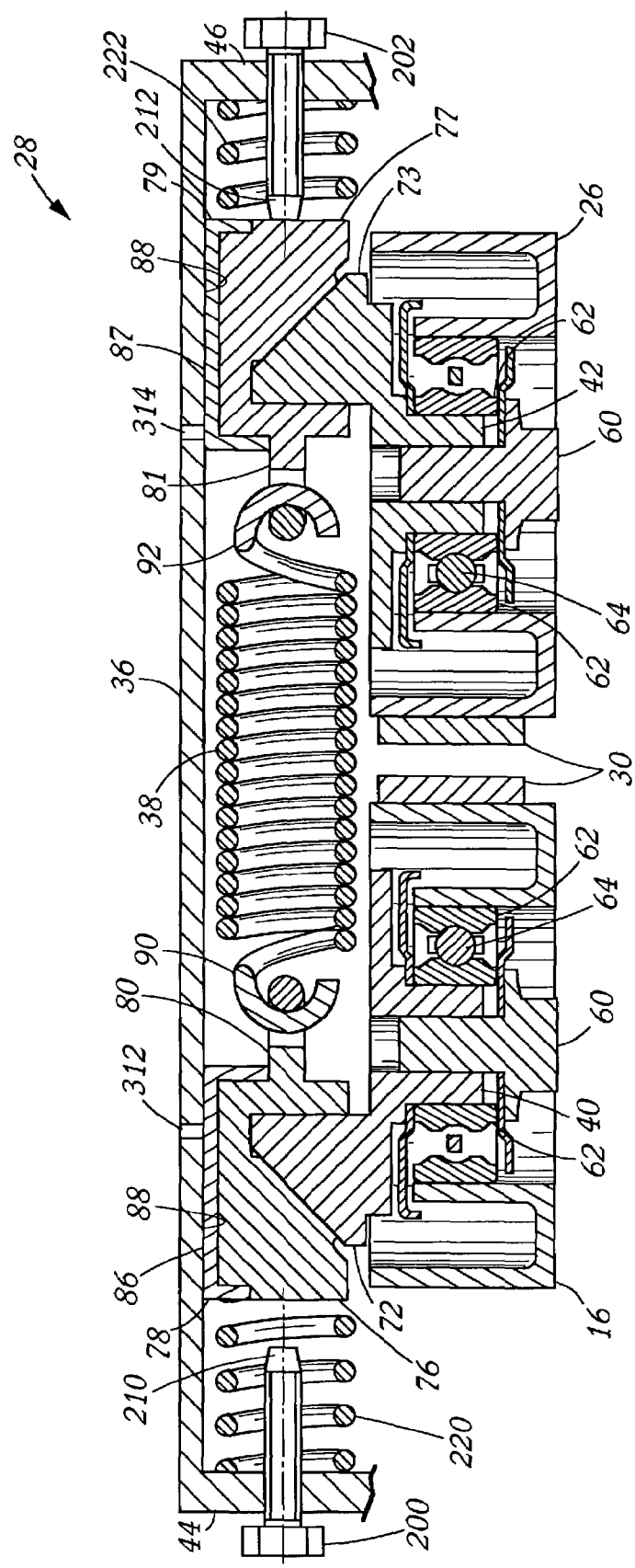
FIG. 10 is a partial section from FIG. 5 taken along line 5-5, depicting operation in the generate mode with a run-in belt.
Figure 11:
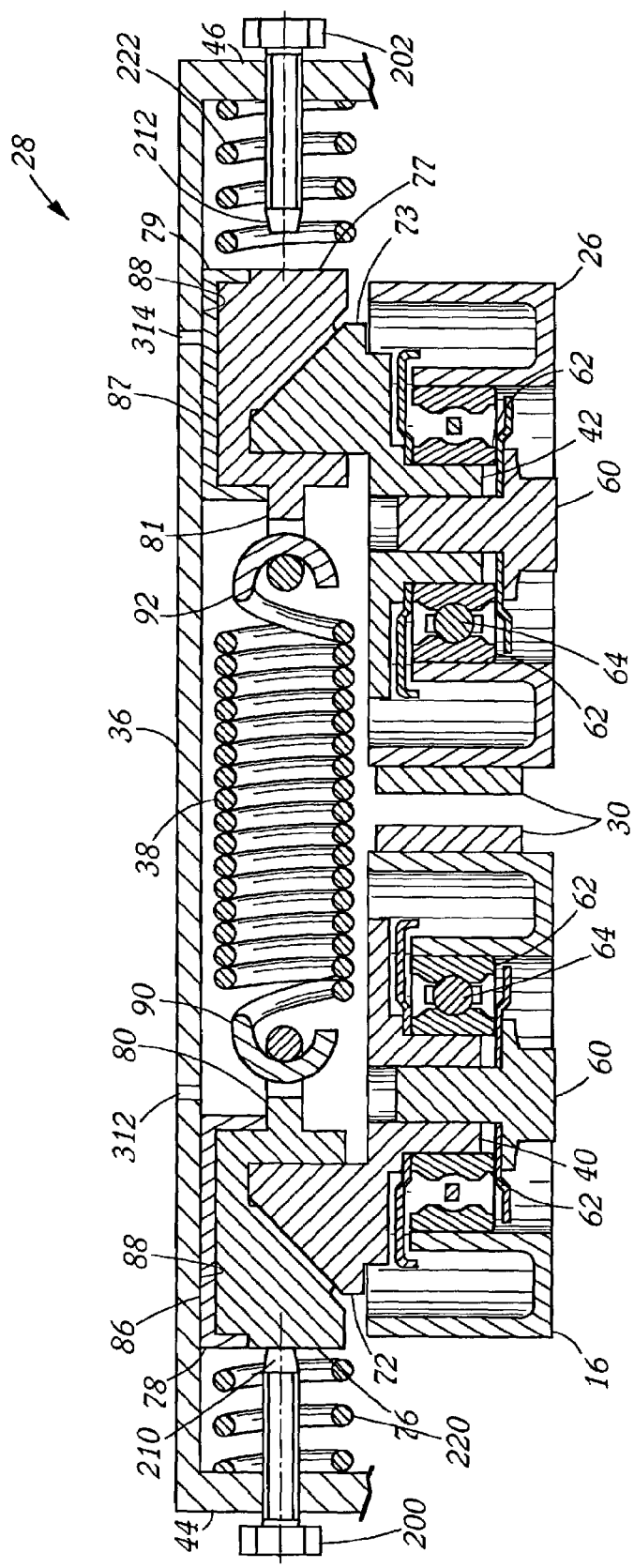
FIG. 11 is a partial section from FIG. 5 taken along line 5-5, depicting operation in the start mode with a run-in belt.

FIGS. 10 and 11 depict operation of tensioner 28 in the generate and start modes, respectively, where belt 30 has stretched and worn. Notice first and second pulleys 16 and 26 are closer than in the previous figures. As there is now more room for carriers 71 to move between the two modes because of the greater length of belt 30, the impacts between the shoes 76 and 77 and bumpers 210 and 212, respectively, will be greater. This exacerbates the opportunity for noise and vibration production. Nonetheless, the operation that minimizes or eliminates the noise or vibration of system 10 still applies.

Figure 12:
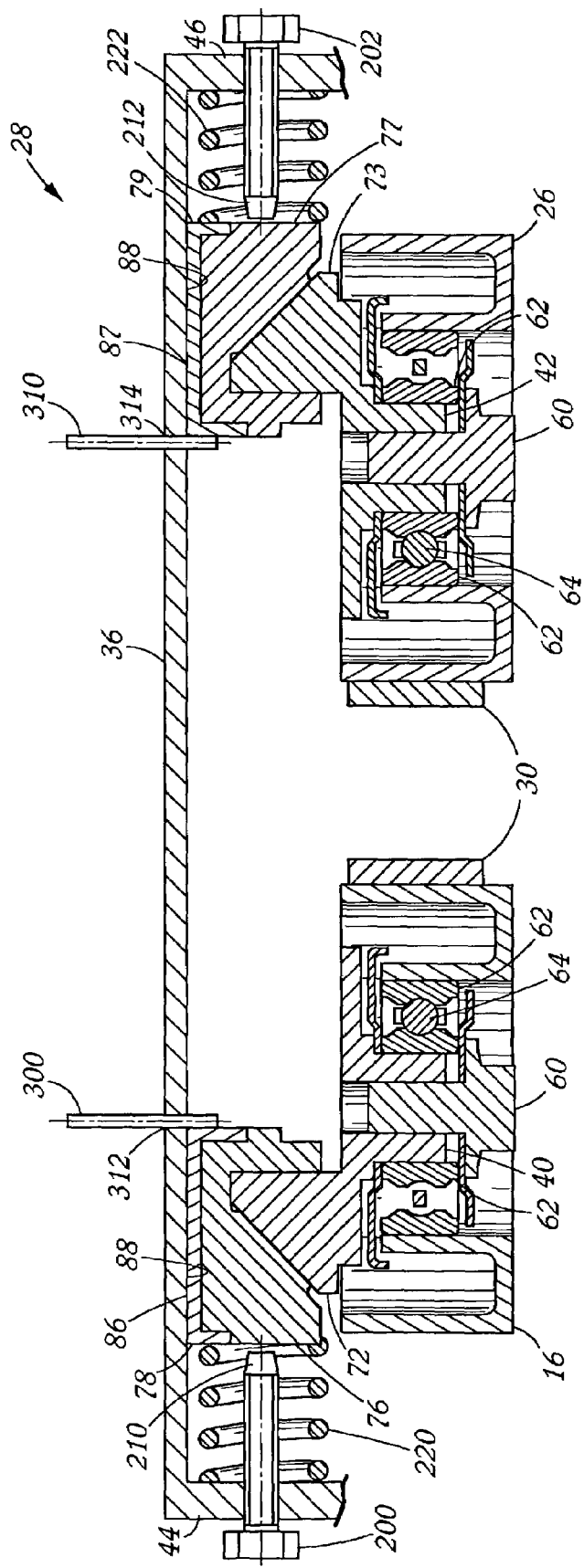
FIG. 12 is a partial section, depicting a cocked position of an alternate tensioner.

FIG. 12 depicts another preferred embodiment of tensioner 28. Spring 38 is absent. The lack of spring 38 leads to the requirement that first and second auxiliary springs 220 and 222 must have higher spring rates, for any given application. This may not be practical for certain application. Also, it removes an opportunity for designing over spring rates for tensioner 28. However, elimination of the additional spring 38 can be viewed as a cost saving measure. The description of installation and operation for the previous embodiment, minus application of spring 38, applies here.

Figure 13:
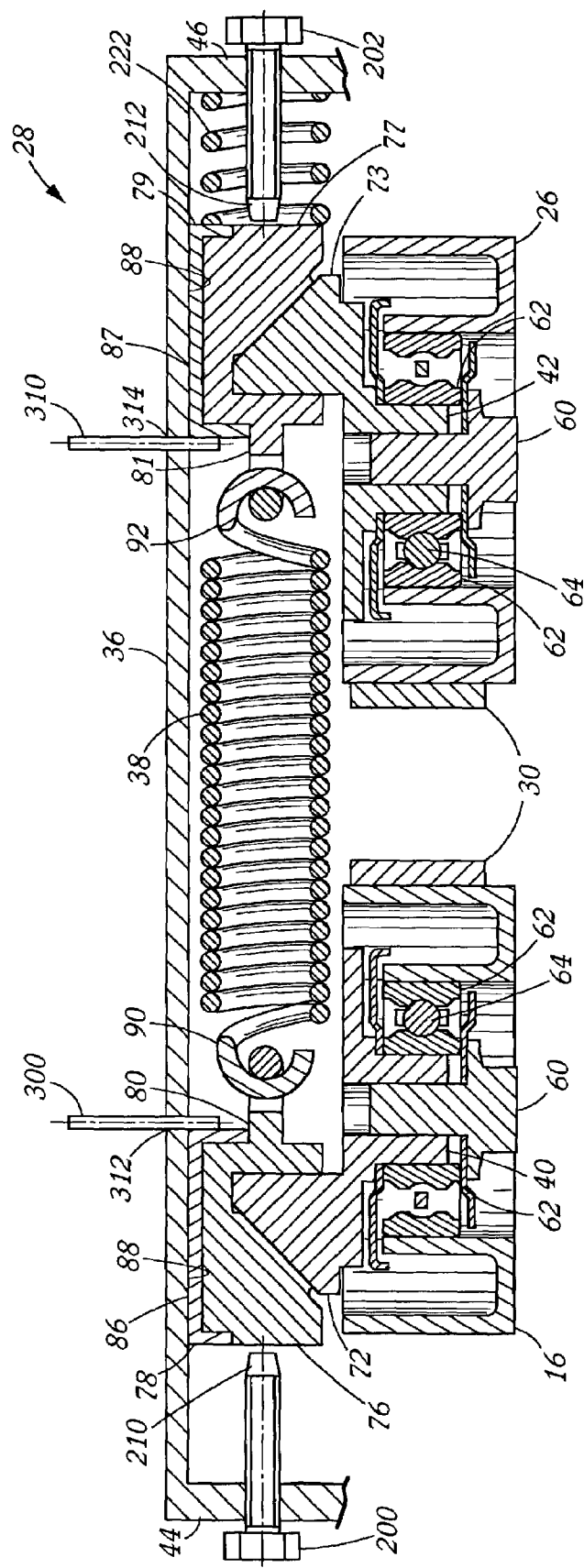
FIG. 13 is a partial section, depicting a cocked position of an alternate tensioner.

FIG. 13 highlights the fact that any one of the three springs 38, 220, or 222 can be removed as the situation requires. It also highlights that either of first or second auxiliary springs 220 or 222 can be removed to alter the relative response of pulleys 16 or 26. In the depicted configuration, second pulley 26 responds to tension changes at start-slack-side span 34 more stiffly than does first pulley 16 to tension changes in start-tight-side span 32. Converse configuration results in a converse response. The relative responses can be altered in a less dramatic fashion by selection of spring rates for each of springs 38, 220, and 222.

Figure 14:
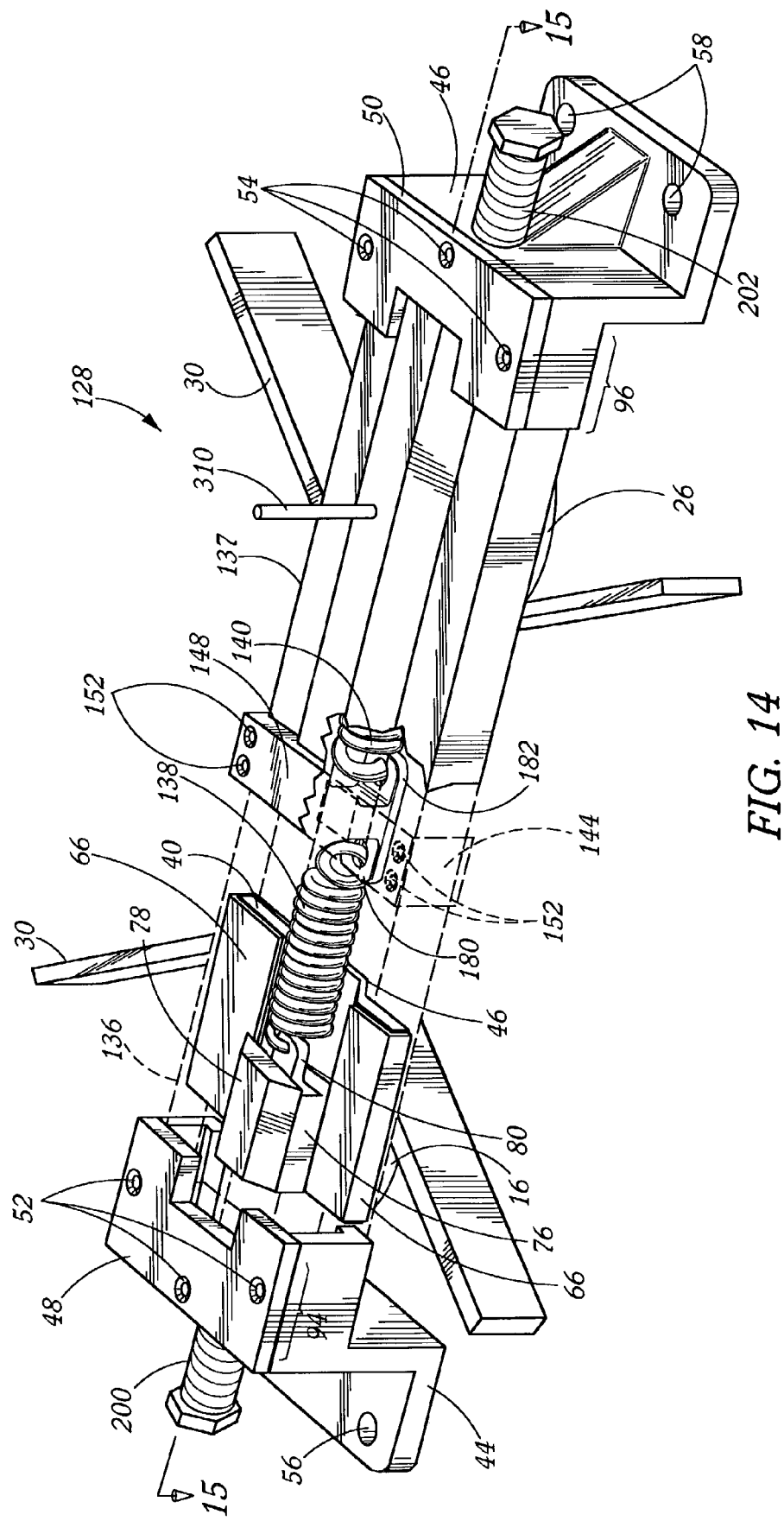
FIG. 14 is a perspective view of another preferred linear movement two pulley tensioner with portions cut away, viewed from above.
Figure 15:
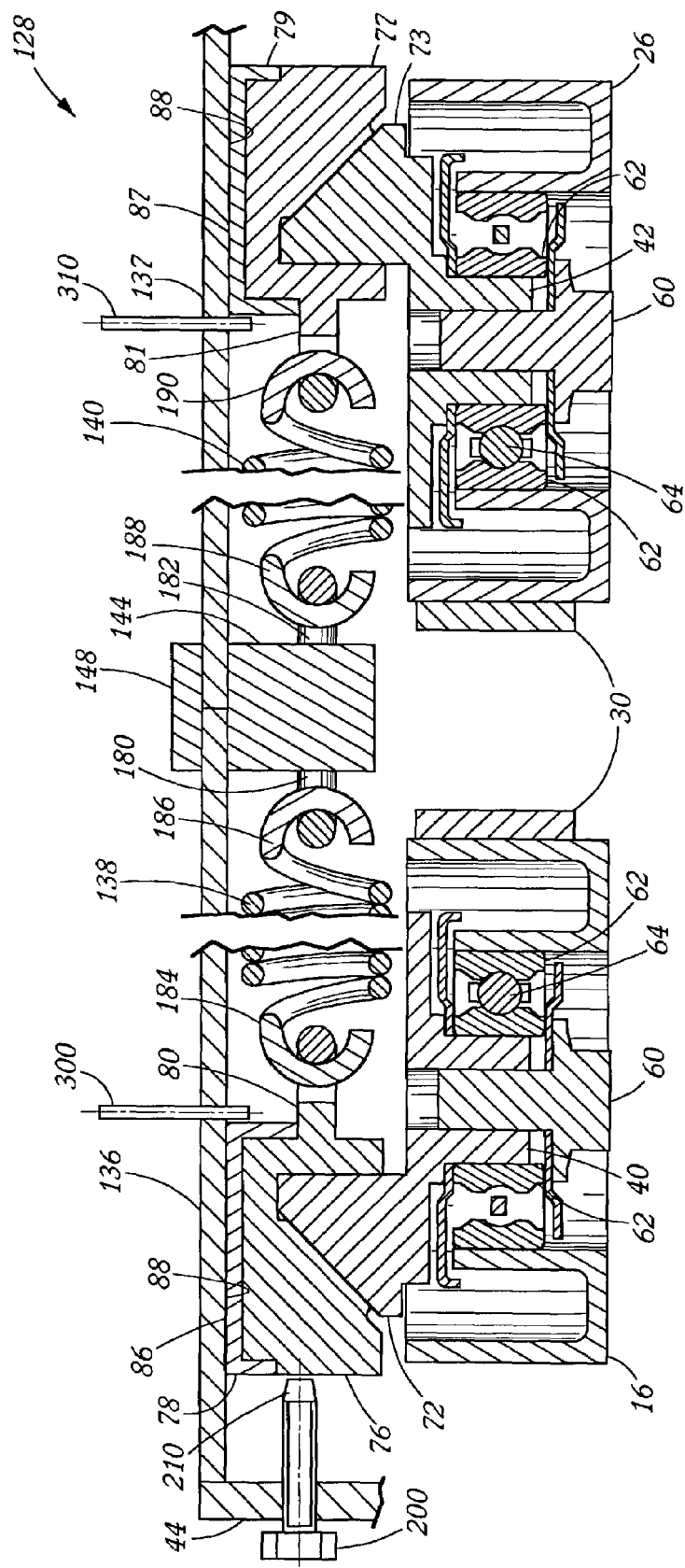
FIG. 15 is a partial section from FIG. 14 taken along line 15-15, depicting a cocked position.

FIGS. 14 and 15 depict yet another embodiment of the tensioner, here carrying the designation of 128. First and second auxiliary springs 220 and 222, which were of the compression type for the previous embodiment of FIG. 12 have been replaced by first and second tension springs 138 and 140. To provide a central attachment point for these two springs 138 and 140, track connector 144 is added. Further, to accommodate this spring configuration, track 36 is separated into two track segments, first and second track segments 136 and 137, respectively. After first and second track segments 136 and 137 are inserted into track connector 144, track connector cap 148 is fastened in place at track connector cap attachment points 152, holding the four units in fixed position. Track connector 144 includes first and second fixed spring loops 180 and 182, whereby the first and second resilient members or springs 138 and 140 connect at second and third spring hooks 186 and 188, respectively. All other aspects of assembly of tension 128 correspond to those of tensioner 28, of FIG. 5. In this alternate preferred embodiment, first and second tensioner pulleys 16 and 26 are biased toward each other, but not mutually. Excluding this modification, the discussion regarding construction, placement, applicability, and operation of the previous embodiments applies to this alternate embodiment. Once again, operation of tension 128 is substantially the same as that of tensioner 28 depicted in FIG. 12. As with the previous embodiments, first and second pulleys 16 and 26 can be biased away from each other by reversal of carrier assemblies 71 and placing first and second fixed spring loops 180 and 181 upon first and second end supports 44 and 46.

Figure 3:
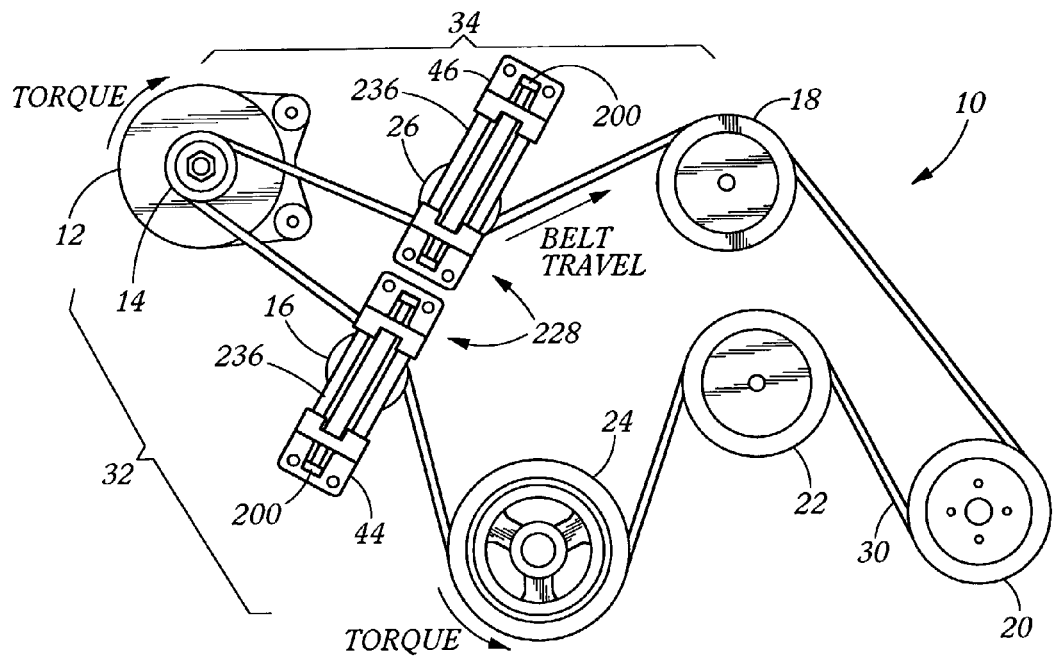
FIG. 3 is a schematic representation of a preferred embodiment of an accessory belt drive system configuration including another linear movement tensioner and a motor/generator with the system in the start mode.
Figure 4:
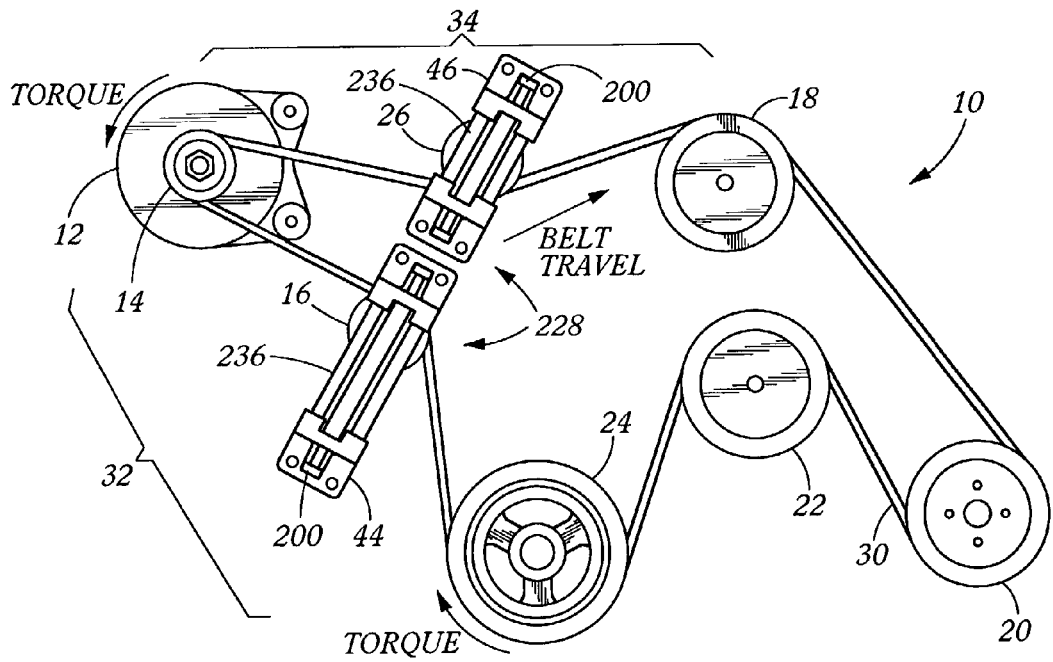
FIG. 4 is a schematic representation of a preferred embodiment of an accessory belt drive system configuration including another linear movement tensioner and a motor/generator with the system in the generate mode.
Figure 5:
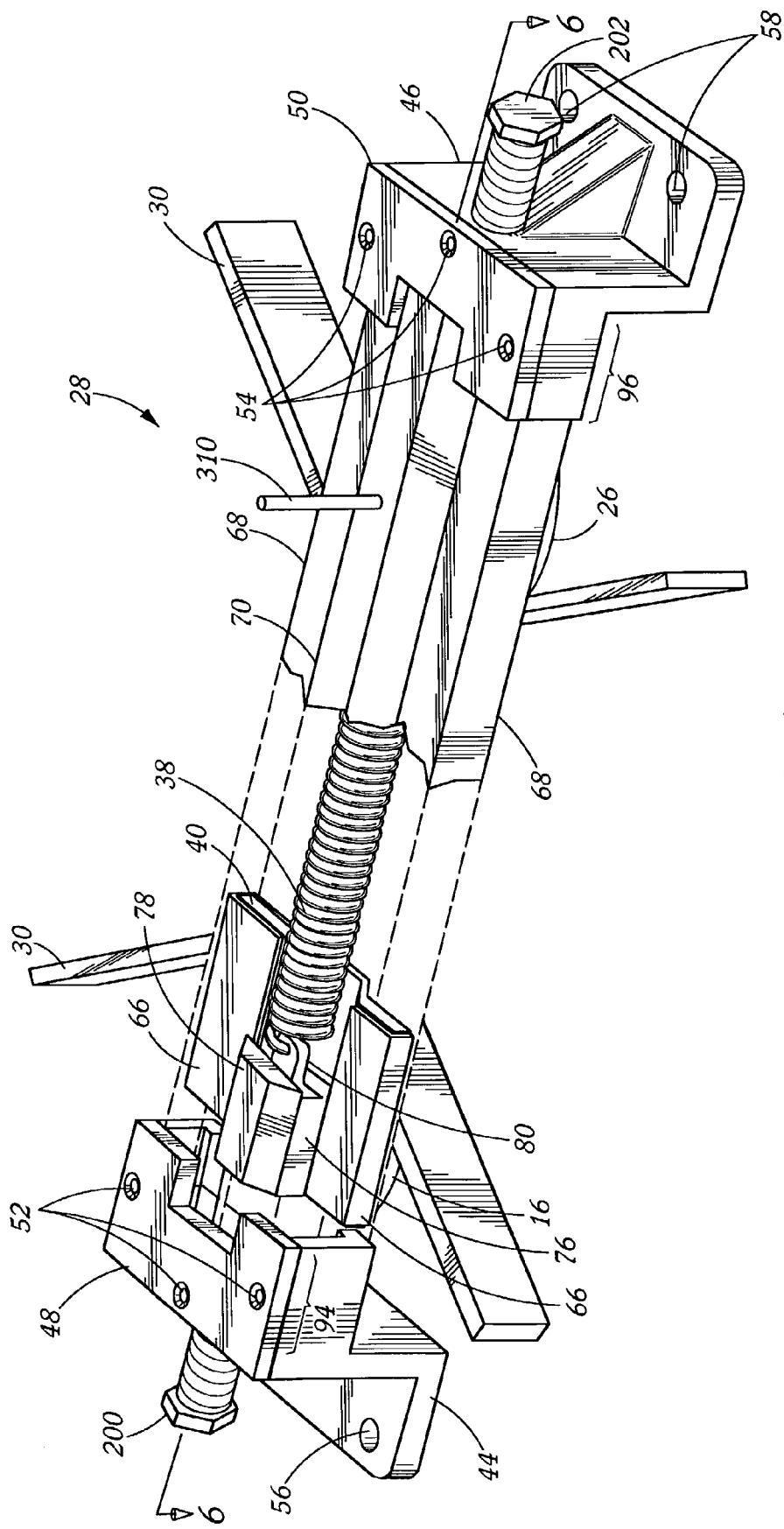
FIG. 5 is a perspective view of a preferred linear movement two pulley tensioner with portions cut away, viewed from above.
Figure 16:
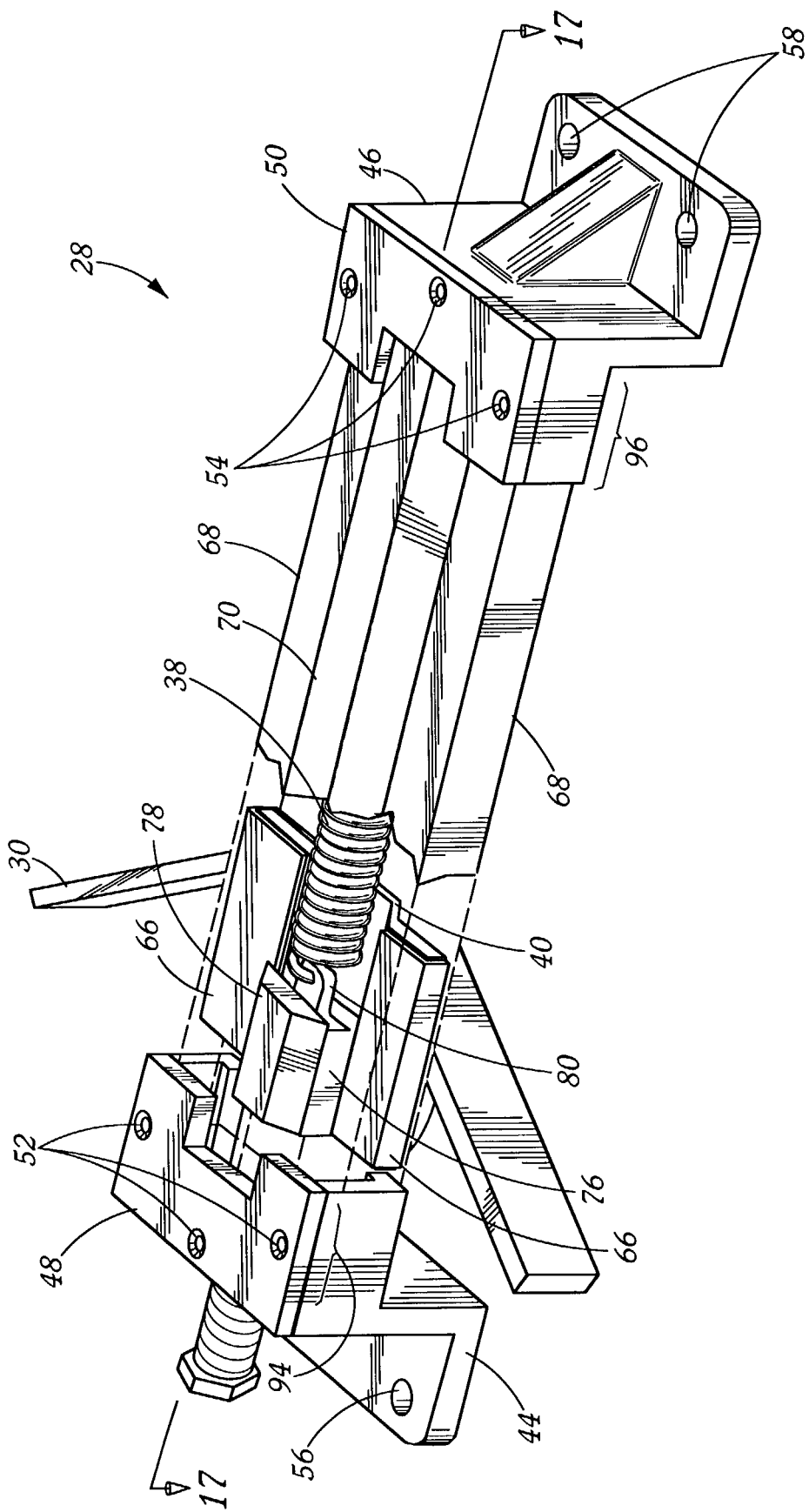
FIG. 16 is a perspective view of another preferred linear movement one pulley tensioner with portions cut away, viewed from above.
Figure 17:
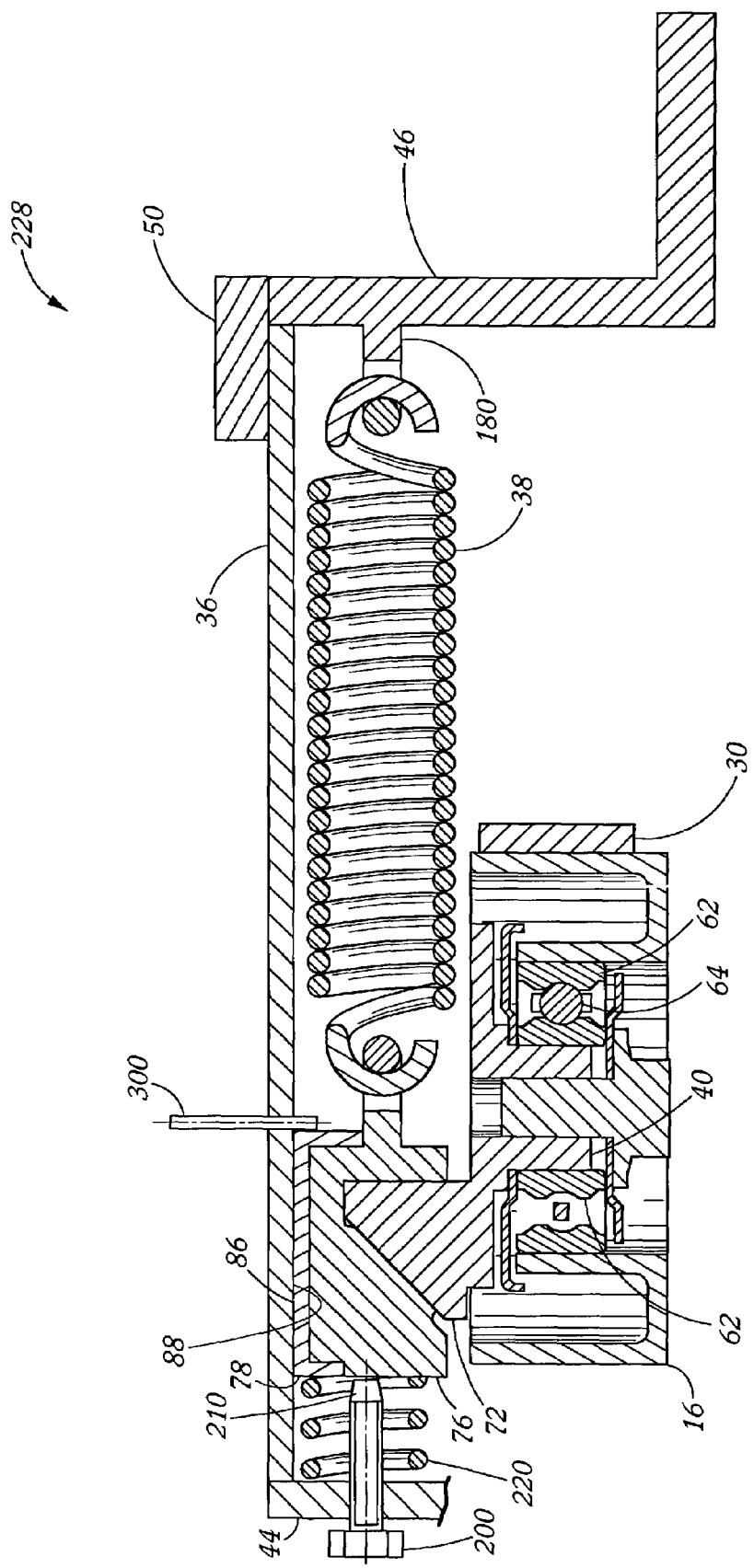
FIG. 17 is a partial section from FIG. 16 taken along line 17-17, depicting a cocked position.

FIGS. 16 and 17, depict a tensioner 228 that can be viewed as a single pulley equivalent of the two pulley tensioner 28 of FIG. 5. Tensioner 228 can be used individually in any belt drive system or paired as depicted in FIGS. 3 and 4. As stated above, it is preferred that the linear path of each first and second pulleys 16 and 26 be oriented perpendicular to the path the associated span would assume if taut between the pulleys at either end of the span, in this case alternator pulley 14 and crankshaft pulley 22 for first tensioner pulley 16 and motor/generator pulley 14 and power steering pump pulley 18 for second tensioner pulley 26, but for the presence of tensioner 28. This orientation minimizes the movement of first and second tensioner pulleys 16 and 26 for any given belt deflection, thus reducing the necessary length of track 36 and allowing tensioner 28 to be more compact overall, and improves the force relationships within tensioner 28 to allow optimal longevity of the internal features of tensioner 28. Using two tensioners 228 allows greater flexibility for placement for reasons of perpendicularity and other space concerns.

Figure 18:
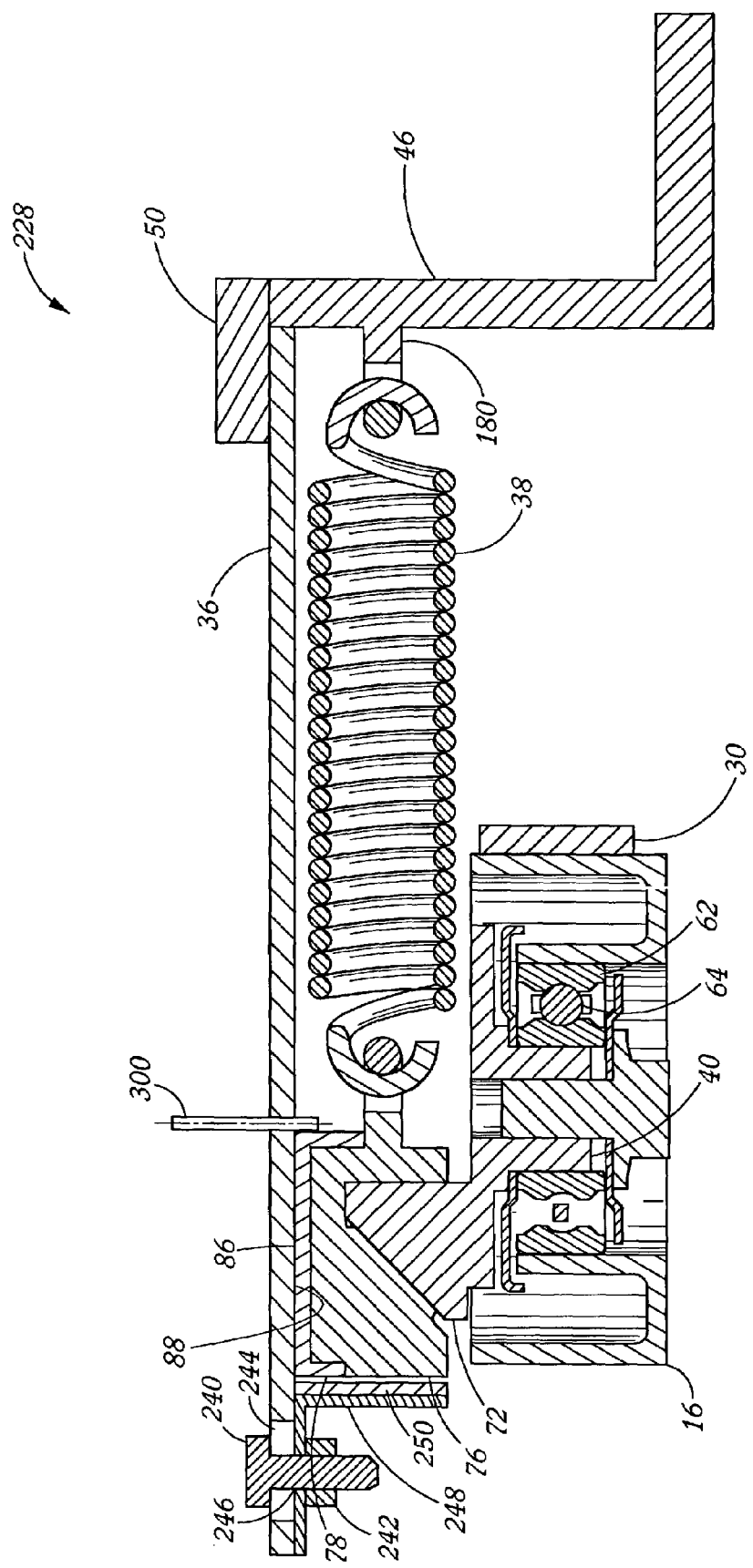
FIG. 18 is a partial section of another preferred linear movement one pulley tensioner, depicting an operating position.

FIG. 18 depicts another embodiment similar to that of FIGS. 16 and 17. The primary difference to be illustrated is that the travel limiting mechanism comprising first adjustment bolt 200 and first bumper 210 is replaced with set bolt 240, set nut 242, set slot 244, adjustable stop 248, and alternate bumper 250. Operation of this travel limiting mechanism involves loosening set bolt/set nut 240/242, moving adjustable stop 248 to the appropriate position, then re-tightening set bolt/set nut 240/242. Once the procedure has been accomplished, operation of this embodiment of tensioner 228 is the same as that of the previously described embodiment. While, this alternate travel limiting mechanism is depicted with tensioner 228, it is applicable to embodiments of tensioner 28.

In sum, the preferred embodiments depicted in the figures allows a compact tensioner with linear movement. The inclusion of mechanical damping, as opposed to hydraulic, allows both its compact size and avoidance of the disadvantages of the inclusion of hydraulics. The mechanical damping mechanism is sophisticated to the point of allowing asymmetrical damping over a substantial range of asymmetry and of enhancing overall tensioner 28 durability without complicated and expensive bearing assemblies at the interface of track 36 and first and second pulley carriers 40 and 42. The inclusion of the travel limiting mechanism that cooperates with the damping mechanism provides substantial improvement in long term performance without substantially impacting short term performance by the introduction of noise and vibration.

Tensioner 28 is shown in one preferred embodiment to include spring 38 operating under tension and directly between first and second spring loops 80 and 81 and within damping channel 70. However, to further reduce overall length of tensioner 28, for those applications requiring it, spring 38 can be located outside of damping channel 70, with a cable and pulley or other mechanism to communicate tensile spring force from outside damping channel 70 to inside damping channel 70 and onto first and second moveable spring loops 80 and 81. This allows the length of spring 38 to mostly coincide with the over all longitudinal dimension of pulley carrier assemblies 71, and thereby reduce the necessary length of track 36 and thus tensioner 28.

A torsion spring can replace the depicted tensile spring 38, whether inside or outside of damping channel 70. It is merely necessary to convert the rotary motion of a torsion spring to a linear motion via a cable connection or other well-known mechanism. Further, it is contemplated that through rotation of pulley carrier assemblies 71 about their respective pulley axes and substitution of a compression spring for tensile spring 38, first and second pulley 16 and 26 can be biased away from each other. In this manner the belt loosening direction would be where first and second pulleys move closer. The belt tensioning direction would be the converse.

The present invention found in the described embodiments accomplishes significant optimization of long-term and short-term performance and belt selection while, at the same time, substantially minimizing cost and complexity and allowing improved flexibility according to the systems to which it can be applied, particularly for motor/generator systems, without sacrificing a smooth and quite running belt drive system.

The foregoing description and illustrative embodiments of the present invention have been shown on the drawings and described in detail in varying modifications and alternative embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

I claim:

1. A belt tensioner for a belt drive system comprising:
   a first belt tensioner pulley;
   a crankshaft pulley;
   an accessory pulley; and
   a power transmission belt trained about said first belt tensioner pulley, said crankshaft pulley, and said accessory pulley, said belt tensioner including an attachment point adapted to be affixed to a stationary point relative to a cylinder block of an engine, a track, a first carrier mounted in sliding relation with said track with two degrees freedom of movement, said first belt tensioner pulley rotatably mounted upon said first carrier for engaging said power transmission belt, a resilient member biasing said first carrier in longitudinal relation to said track, and a first travel limiting bumper limiting travel of said first carrier along said track said first travel limiting bumper including an adjustment mechanism which provides an adjustable tensioner travel limit without altering the biasing provided by said resilient member.

2. The belt tensioner of claim 1 further comprising a damping mechanism cooperating with said first travel limiting bumper to limit tensioner travel.

3. The belt tensioner of claim 2 wherein said cooperation of said damping mechanism and said first travel limiting bumper includes modifying the amount of damping provided by said damping mechanism.

4. The belt tensioner of claim 1, further comprising a release mechanism.

5. The belt tensioner of claim 4 wherein said release mechanism includes a removable installation pin.

6. The belt tensioner of claim 1, further comprising a second carrier mounted in sliding relation with said track with two degrees freedom of movement, a second belt tensioner pulley rotatably mounted upon said second earner for engaging said power transmission belt a resilient member biasing said second carrier in longitudinal relation to said tack, and a second travel limiting bumper limiting travel of said second carrier alone said track, said second travel limiting bumper including an adjustment mechanism which provides an adjustable tensioner travel limit without altering the biasing provided by said resilient member.

7. An improved belt tensioner for a belt drive system having a first belt tensioner pulley, a crankshaft pulley, an accessory pulley, and a power transmission belt trained about said first belt tensioner pulley, said crankshaft pulley, and said accessory pulley, said belt tensioner including an attachment point adapted to be affixed to a stationary point relative to a cylinder block of an engine, a track, a first carrier mounted in sliding relation with said track with two degrees freedom of movement, said first belt tensioner pulley rotatably mounted upon said first carrier for engaging said power transmission belt, a resilient member biasing said first carrier in longitudinal relation to said track, and a damping mechanism damping movement of said first carrier in relation to said track, the improvement comprising:

said belt tensioner including a travel limiting mechanism adapted to affect the level of damping of said damping mechanism without altering the biasing provided by said resilient member.

* * * * *